US008897425B2

United States Patent
Kent, Jr. et al.

(10) Patent No.: US 8,897,425 B2
(45) Date of Patent: *Nov. 25, 2014

(54) METHODS, SYSTEMS, AND PRODUCTS FOR ACCESSING CALL LOGS

(75) Inventors: Larry Kent, Jr., Loganville, GA (US); William Todd Daniell, Kennesaw, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 304 days.

This patent is subject to a terminal disclaimer.

(21) Appl. No.: 13/299,534

(22) Filed: Nov. 18, 2011

(65) Prior Publication Data

US 2012/0128141 A1 May 24, 2012

Related U.S. Application Data

(63) Continuation of application No. 11/548,792, filed on Oct. 12, 2006, now Pat. No. 8,090,081.

(51) Int. Cl.
*H04M 1/64* (2006.01)
*H04M 15/00* (2006.01)

(52) U.S. Cl.
CPC ..................................... *H04M 15/00* (2013.01)
USPC ................... 379/88.12; 379/88.13; 379/88.17

(58) Field of Classification Search
USPC .............. 379/76, 88.12–88.14, 88.13, 88.17, 379/142.01; 455/414.1
See application file for complete search history.

(56) References Cited

U.S. PATENT DOCUMENTS

| | | |
|---|---|---|
| 5,655,015 A | 8/1997 | Walsh et al. |
| 6,034,715 A | 3/2000 | Ishida et al. |
| 6,091,808 A | 7/2000 | Wood et al. |
| 6,219,413 B1 | 4/2001 | Burg |
| 6,282,275 B1 | 8/2001 | Gurbani et al. |
| 6,404,860 B1 | 6/2002 | Casellini |
| 6,697,474 B1 | 2/2004 | Hanson et al. |
| 6,724,872 B1 | 4/2004 | Moore et al. |
| 6,763,226 B1 | 7/2004 | McZeal, Jr. |
| 6,768,792 B2 | 7/2004 | Brown et al. |
| 6,917,672 B2 | 7/2005 | Brown et al. |
| 6,950,503 B2 | 9/2005 | Schwartz et al. |
| 7,027,463 B2 | 4/2006 | Mathew et al. |
| 7,092,502 B2 | 8/2006 | Mohn et al. |
| 7,099,658 B2 | 8/2006 | Kim |
| 7,123,706 B2 | 10/2006 | Ooki |
| 7,203,294 B2 | 4/2007 | Carnazza et al. |
| 7,224,774 B1 | 5/2007 | Brown et al. |
| 7,245,704 B2 | 7/2007 | Binning |
| 7,248,677 B2 | 7/2007 | Randall et al. |
| 7,289,617 B2 | 10/2007 | Barnes |
| 7,302,272 B2 | 11/2007 | Ackley |
| 7,403,766 B2 | 7/2008 | Hodge |
| 7,424,282 B2 | 9/2008 | Barbeau |
| 7,603,105 B2 | 10/2009 | Bocking et al. |
| 7,639,943 B1 | 12/2009 | Kalajan |
| 7,778,399 B2 | 8/2010 | Ambrose |

(Continued)

*Primary Examiner* — MD S Elahee
(74) *Attorney, Agent, or Firm* — Scott P. Zimmerman, PLLC

(57) ABSTRACT

Methods, systems, and products provide remote access to call logs upon request. An incoming call is processed and an address is retrieved that is associated with a called number. An electronic message is sent to the address to identify a calling number of the incoming call. A log of calls is updated with the incoming call. A reply electronic message is received from the address, and the log of calls is sent to the address.

20 Claims, 28 Drawing Sheets

(56) References Cited

U.S. PATENT DOCUMENTS

| | | |
|---|---|---|
| 7,869,792 B1 | 1/2011 | Zhou et al. |
| 2001/0032335 A1 | 10/2001 | Jones |
| 2002/0088002 A1 | 7/2002 | Shintani et al. |
| 2002/0161480 A1 | 10/2002 | Kakutani et al. |
| 2003/0023854 A1 | 1/2003 | Novak et al. |
| 2003/0174815 A1 | 9/2003 | Didcock et al. |
| 2003/0229722 A1 | 12/2003 | Beyda |
| 2004/0032503 A1 | 2/2004 | Monden et al. |
| 2005/0041787 A1 | 2/2005 | Casey et al. |
| 2005/0096009 A1 | 5/2005 | Ackley |
| 2005/0195802 A1 | 9/2005 | Klein et al. |
| 2006/0041627 A1 | 2/2006 | Tu |
| 2006/0116113 A1 | 6/2006 | Gass |
| 2006/0268122 A1 | 11/2006 | Iwasaki et al. |
| 2007/0002129 A1 | 1/2007 | Benco et al. |
| 2007/0094691 A1 | 4/2007 | Gazdzinski |
| 2007/0099637 A1 | 5/2007 | Mangla et al. |
| 2007/0140150 A1 | 6/2007 | Beck et al. |
| 2007/0178915 A1 | 8/2007 | Khan |
| 2007/0201665 A1 | 8/2007 | Kocan et al. |
| 2007/0206612 A1 | 9/2007 | Yang et al. |
| 2007/0230668 A1 | 10/2007 | Brown et al. |
| 2007/0232279 A1 * | 10/2007 | Sjogren et al. ............. 455/414.1 |
| 2008/0055269 A1 | 3/2008 | Lemay et al. |
| 2008/0056473 A1 | 3/2008 | Kent et al. |
| 2008/0064363 A1 | 3/2008 | Salafia et al. |
| 2008/0075241 A1 | 3/2008 | Kent et al. |
| 2008/0075242 A1 | 3/2008 | Kent et al. |
| 2008/0125079 A1 | 5/2008 | O'Neil et al. |
| 2008/0246605 A1 | 10/2008 | Pfeffer et al. |
| 2009/0320077 A1 | 12/2009 | Gazdzinski |
| 2010/0166166 A1 | 7/2010 | Smith et al. |

* cited by examiner

FIG. 8

TED'S CONTACT LIST

☐ JAKE
☒ HOMEPHONE
☐ SUE

YOUR NICKNAME: TED

HOMEPHONE> CALL LOG:

9:00 AM CALL FROM SUE (666-555-7777). LEFT VOICEMAIL.

11:12 AM CALL FROM UNKNOWN. DID NOT LEAVE VOICEMAIL.

2:12 PM CALL FROM MOTHER. ANSWERED BY DAUGHTER. CALL LASTED 23 MINUTES.

3:00 PM OUTGOING CALL FROM DAUGHTER TO TED. CALL LASTED 20 SECONDS.

>|

910

SEND

METHODS, SYSTEMS, AND PRODUCTS FOR ACCESSING CALL LOGS

CROSS-REFERENCE TO RELATED APPLICATIONS

This application is a continuation of U.S. application Ser. No. 11/548,792 filed Oct. 12, 2006 and now issued as U.S. Pat. No. 8,090,081, and incorporated herein by reference in its entirety.

This application also claims priority to U.S. Provisional Application 60/823,955, filed Aug. 30, 2006 and entitled "Communication System with Broad Band Station," which is also incorporated herein by reference in its entirety.

TECHNICAL FIELD

The present disclosure is generally related to communication systems and, more particularly, is related to integration of communication systems.

BACKGROUND

Generally, a telephone is used to provide voice communications between two parties. For other communications, another communication device is often used, such as a computer, where visual information may be conveyed. Regardless of the capabilities of a computer, the telephone is a focal point of communications within a household. However, with emerging communication modes and channels, integration of these devices and elements are desired, especially with the increased prevalence of home networks.

Thus, a heretofore unaddressed need exists in the industry to address the aforementioned deficiencies and inadequacies.

SUMMARY

Embodiments of the present disclosure provide methods, systems, and devices for maintaining a call log. In this regard, one embodiment of such a method, among others, can be broadly summarized by the following: receiving an incoming call on a telephone device; obtaining call information about the incoming call via the telephone device; updating a call log with the call information via the telephone device; and enabling the call log to be accessed from a remote Internet location.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5-8 are diagrams illustrating an exemplary interface to a chat client communicating with the BBS of FIG. 2.

DETAILED DESCRIPTION

Figure 1:
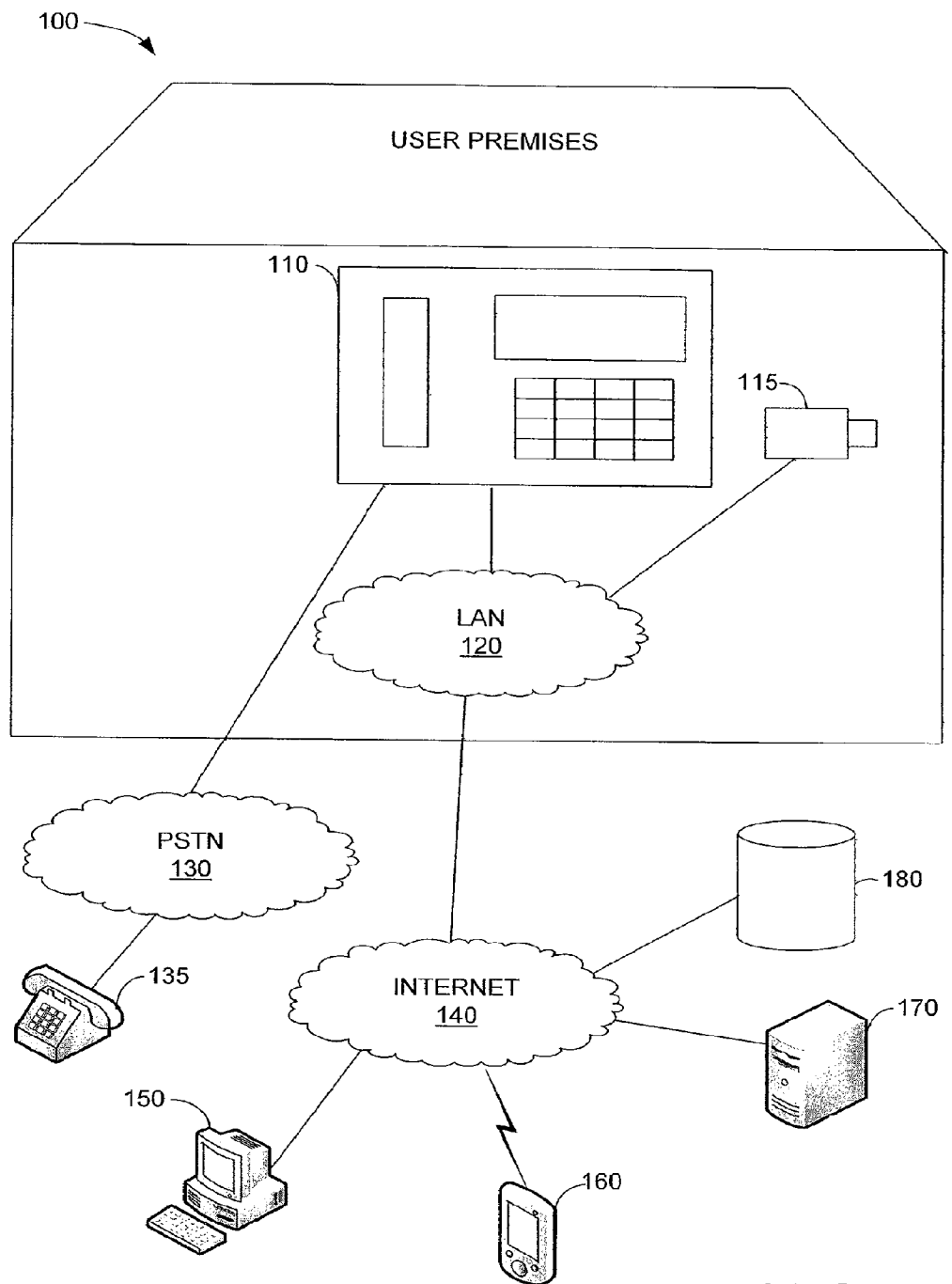
FIG. 1 is a diagram of one embodiment of a communication system in accordance with the present disclosure.

Referring to FIG. 1, one embodiment of a communication system 100 includes a broadband station (BBS) 110. BBS 110, in one embodiment, is a client device with Internet access designed to connect to a local access network (LAN) 120. BBS 110 may also be WI-FI client (IEEE 802.11b/802.11g compliant) and be designed to connect with wireless LAN (WLAN) (not shown). It is contemplated that the BBS 110 may often be situated at a user premises.

Accordingly, one embodiment of BBS 110 features a port for Ethernet or LAN access which may provide access to Internet 140 and devices connected thereto (e.g., PC 150, wireless PDA (personal digital assistant) 160, server 170, database 180, etc.). BBS 110 may also include digital cordless technology supporting analog PSTN calls from PSTN 130 and devices connected thereto (e.g, telephone 135, etc.).

In some embodiments, BBS 110 also includes video communications and may include an option for integrating a camera 115. BBS 110 also includes a high resolution color liquid crystal display (LCD) with touch-screen interface. BBS 110 further includes an operating system such as, for example WINDOWS WinCE.Net operating system, with application programming interface, networking protocols and codecs, and multimedia engine for customized applications and services.

Figure 2:
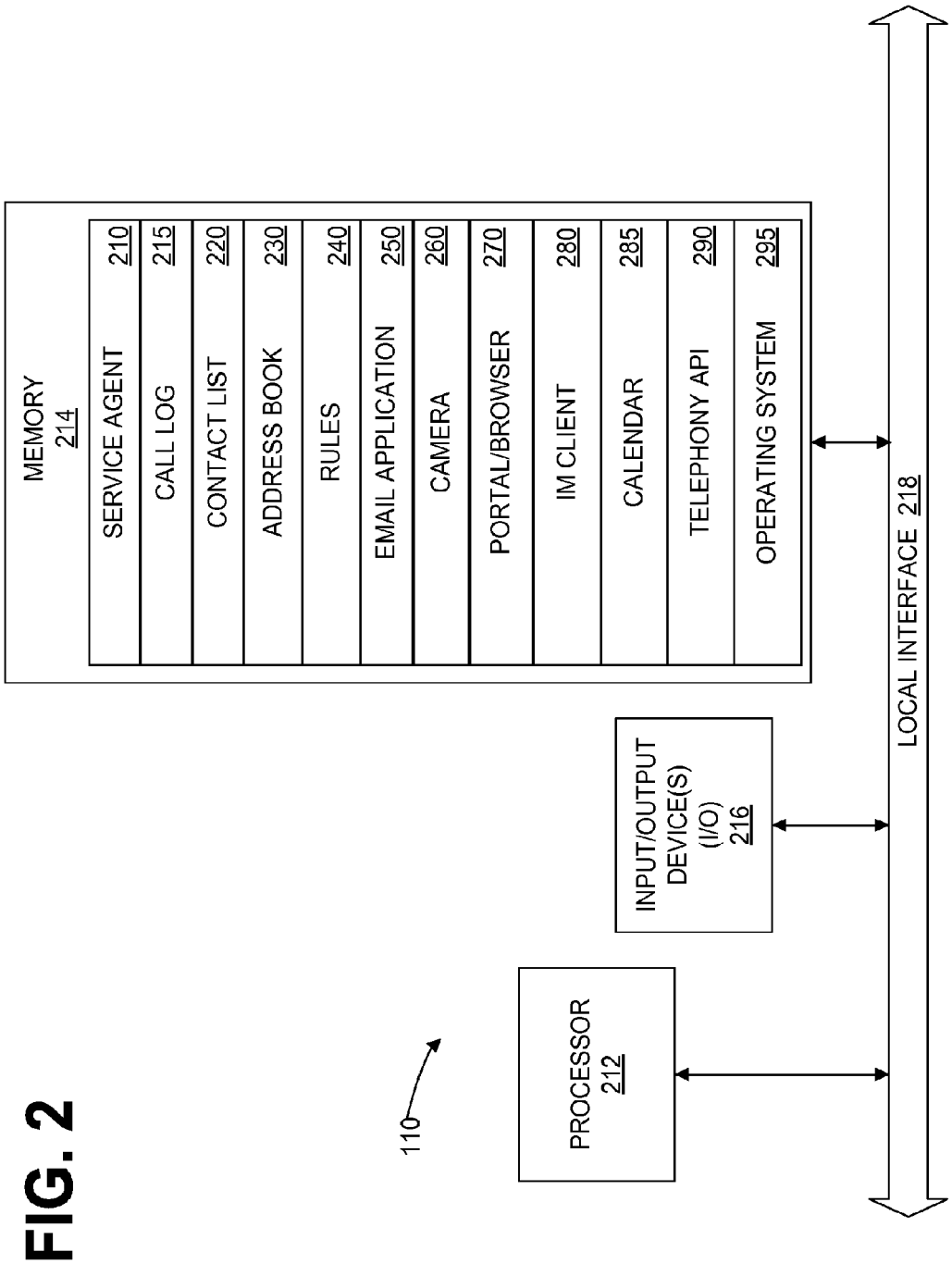
FIG. 2 is a block diagram of an embodiment of a broadband station (BBS), such as that shown in FIG. 1.

Generally, in terms of hardware architecture, as shown in FIG. 2, BBS 110 includes a processor 212, memory 214, and one or more input and/or output (I/O) devices 216 that are communicatively coupled via a local interface 218. The local interface 218 can be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 212 is a hardware device for executing software, particularly that stored in memory 214. The processor 212 can be any custom made or commercially available processor, a central processing unit (CPU), an auxiliary processor among several processors associated with the BBS 110, a semiconductor based microprocessor (in the form of a microchip or chip set), a macroprocessor, or generally any device for executing software instructions.

The memory 214 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the processor 212.

The software in memory 214 may include one or more separate programs, each of which comprises an ordered listing of executable instructions for implementing logical functions. In the example of FIG. 2, the software in the memory 214 includes a service agent 210, call log 215, contact list 220, address book 230, rules 240, email application 250, camera application 260, portal/browser application 270, instant messaging (IM) client 280, calendar 285, telephone API 290, and operating system (o/s) 295 (e.g., WinCE.Net). The operating system 295 controls the execution of other computer programs and provides scheduling, input-output control, file and data management, memory management, and communication control and related services.

The I/O devices 216 may include input devices, for example but not limited to, a keypad, touchscreen, microphone, etc. Furthermore, the I/O devices 216 may also include output devices, for example but not limited to a display, speaker, etc. Finally, the I/O devices 216 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the BBS 110 is in operation, the processor 212 is configured to execute software stored within the memory 214, to communicate data to and from the memory 214, and to generally control operations of the BBS 110 pursuant to the software.

As mentioned above, some of the services and application provided by some embodiments of BBS 110 include a calendar 285, address book 230, etc.; a portal/browser application 270 providing news, weather, traffic sports, maps, stocks, etc.; email client 250, instant messaging client 280, etc.

In addition, in accordance with the present disclosure, in one embodiment, a service agent 210 resides in memory of BBS 100 and may be configured to alert a user of incoming analog telephone calls using the instant messaging application 280 or other functions.

For one embodiment, the service agent 210 communicates with a telephone API 290 (application programming interface) for the BBS 110. Therefore, the service agent 210 can detect when an incoming telephone call is being received by the BBS 110. The service agent 210 as a result sends an instant message to a user notifying the user of the incoming call. Identification of the calling party may be determined from caller-ID information received by the BBS 110. The service agent 210 may be configured to send notifications to an instant messaging address provided by the user. Therefore, an instant message sent by the BBS 110 to such an instant messaging address is delivered in accordance with preference and rules established by the provider of the instant messaging address and the instant messaging application 280.

Generally, the BBS 110 sends an instant message to the user at an instant messaging address where the user is determined to be online. If the user is not currently online, then the message may be queued and stored and then forwarded when the user is detected to be online. It is noted that the instant messaging application 280 on the BBS 110 may be used to locate a user and also be used as a notification mechanism through the BBS 110.

Since the BBS 110 has its own instant messaging client 280, the BBS 110 could be set up as the lowest priority IM client since the BBS is always on or connected to the Internet. For example, some instant messaging systems allow multiple simultaneous sessions involving multiple clients. For example, JABBER allows multiple simultaneous client logins of the same instant messaging address ("JABBER ID"), and JABBER directs instant messages to the client having the highest priority for that address. Therefore, the BBS 110 could be set up as having the lowest priority IM client.

Further, the service agent 210 may be set up to have its own instant messaging identity. This identity may be listed as a contact on the user's contact list 220 for instant messaging.

In addition, the user could send BBS 110 commands and instructions using the service agent's instant messaging identity. For example, the user from his or her work client 150 could communicate with the BBS 110 using the BBS's instant messaging identity for the service agent. For example, the user may request the service agent on the BBS to send a call log back to the user at his work client 150. The call log may identify and describe incoming calls to the BBS 110 or even outgoing calls made from the BBS 110.

Consider the following scenario. A user is expecting a call to his home telephone number where the BBS 110 is located. The call that the user is expecting is from a pest control person so that an appointment may be scheduled for pest inspection to be performed at the home. So, when the call is actually made, the service agent 210 of the BBS 110 detects the call and obtains caller-ID information. The service agent 210 then sends an instant message containing the name of who is making the call and the telephone number where the call is being made. The instant message is sent to the user at an instant messaging address designated within a set of rules 240 defined by the user. In one embodiment, this all may be done while the BBS 110 is ringing to announce the incoming call at the home.

In one embodiment, the instant message may ask the user to specify instructions for handling the call that is being received by the BBS 110. So, not only does the BBS 110 notify the user of the incoming call with information on who is making the call and a number where the party may be reached, the BBS 110 also provides options for handling the call remotely. For example, the user could reply to the instant message with instructions to forward the call to another telephone number (where the number is specified in the instant message itself), instructions to send the call to voicemail, instructions to let the incoming call be left alone (or a reply could just not be sent), etc. Via an instant messaging session, remote control operation of the BBS 110 may be implemented. For example, BBS 110 may receive a call over PSTN 130 and in real time, a user can receive notification and can start making decisions about what the user's prefers to do. The BBS 110 has a full API 290 to control all the telephone features of the phone that are accessible to the service agent 210.

In one embodiment, a user can define rules that affect how BBS 110 handles incoming telephone calls. For example, a rule may be specified that if a call is received from someone in a user's address book 230 (that is stored on BBS 110), a notification message may be sent to the user. Otherwise, a message is not sent. Further, different rules may be enacted based upon time of day, day of the week, etc. Also, rules may be based on who the calling party is. Therefore, when BBS 110 receives a call, the particulars and characteristics of the call can determine which specific action is taken (e.g., direct call to voicemail, hang up on call, forward call to another number, etc.).

In accordance with one or more embodiments, rules do not have to be stored locally on the BBS 110 device. For example, calls may be stored remotely in an Internet database 180 and accessed by the BBS 110 over the Internet 140. In this way, a user from a remote location can access the rules and configure and modify them, if need be, from another client device 150, 160, etc.

In communicating with the service agent 210 from a remote client, a user could be provided a menu of options for configuring the BBS 110 or instructing the BBS 110 to perform requested actions. As previously suggested, a contact for the service agent 210 may be added to the user's contact list 220 so that a user can communicate with the service agent 210 from a remote location. In communicating with the service agent 210, the service agent may send a menu of options for different actions that can be selected by the user. To select one of the options, the user can identify one of the options in a reply message back to the service agent. For example, one option may be to transfer a call log 215 identifying and describing incoming calls to the BBS 110 or even outgoing calls made from the BBS 110.

In one embodiment, a call log may be stored remotely from the BBS on the Internet 140. For example, in one embodiment, the call log may be accessible from a portal site of a user's Internet provider (via database 180). Therefore, the BBS 110 may also access the user's call log and populate the call log with desired information. Accordingly, a user could access the call log from any Web-based client 150 that has access to the Internet 140, in some embodiments.

Further, in one embodiment, multiple BBS 110 at different locations could be used to populate a singular call log. Therefore, if a user has a BBS 110 at home and a BBS at work or a second home, each BBS unit could populate one call log. Within the call log, information such as identification of the caller, time of day when the call was made, identification of the calling phone number, and disposition of the call (e.g., caller left a voice message, caller was forwarded to number 555-6666, etc.) may be included. Also, in some embodiments, individual call logs for individual BBS devices may be maintained.

Embodiments of the present disclosure enable a user to interact with a remote phone, such as a home phone, in real time. Unlike previous versions of Internet Call Waiting systems that required users to have a dedicated Internet Call Waiting client on a user's desktop, one embodiment of the present disclosure interacts with a remote phone system by utilizing a contact on an instant messaging contact list 220. This is much less invasive and is more compatible with existing software systems of pre-existing computer client devices. As such, according to exemplary embodiments, custom clients on the remote computer or special types of connections are not required. The BBS 110 may provide the ability to communicate via instant messaging technology from a home telephone device and combine instant messaging capabilities with a full-featured Internet capable telephone is seemingly novel. This gives a user remote access to a home appliance.

With previous versions of Internet Call Waiting, the PSTN telephone network 130 also typically had a switch having to be provisioned to do certain functions, such as detecting that the called party was a subscriber to Internet Call Waiting service or detecting that the called party was connected to the Internet. By making the terminal device, such as the BBS 110, have access to rules 240 for determining handling and routing of the call with the intelligence to implement the rules, the notification services provided by the BBS 110 work with any telephone network switch without any special customizations with regard to the switch.

In some embodiments, the BBS 110 is a dual mode device that can make and receive VoIP (Voice over Internet Protocol) telephone calls in addition to PSTN calls. This allows even more flexibility with regard to the service capable of being performed by the BBS 110. With an IP (Internet Protocol) switch, more sophisticated call forwarding can be implemented. In the same way that PSTN calls can be rerouted by the BBS 110, VoIP calls may also be rerouted.

Another service capable of being performed by embodiments of the communication system of the present disclosure is parental control services. For example, rules 240 may be set up restricting access to certain operations or functions to be performed on the BBS 110. Further, restrictions can be specified for particular users, such as children that reside in a household. For example, assume that Jane is a child that lives in a household using the BBS 110. Jane's parents have implemented rules that restrict Jane's use of the BBS 110. One of these rules specifies which telephone numbers Jane is allowed to call. Other rules 240 may specify the time of the day that Jane is allowed to make telephone calls, maximum duration that Jane is allowed to be engaged on the BBS 110, etc. Accordingly, for a user to make an outgoing call, the BBS 110 may have a log-in prompt that requests the user to identify himself or herself, such as with a personal identification number associated with the user. After a user has authenticated himself or herself, the BBS 110 enforces whatever rules have been created for the user.

Further, in some embodiments, BBS 110 may be configured to send notifications on whatever uses are being made on the telephone (BBS 110) by Jane. Further, if Jane attempts a prohibited activity, a parent may be contacted via a notification message and be prompted to authorize or prohibit the requested activity and pre-existing rule. These decisions can be made in real time.

Therefore, BBS 110 can have rules stored locally or accessible from an Internet database 180 that include authorized logins, passwords, rules on who is allowed to use the phone, how long they can use it, etc. Further, the phone can log how much a user has used the phone, if he or she has made a phone call, to whom it was made, etc. Via instant messaging, the phone could alert a parent or other user as to who the monitored user is attempting to call and ask if it is okay for them to make the call. The monitored user could even get permission to make long distance call or 900 call or talk to their friend, in some embodiments.

Generally, a user can be notified in real time of activities for which the BBS 110 is being used. The BBS 110 can log and notify the user of these activities being performed on the BBS 110. One such use for such notification services is to provide parental controls on use of the BBS 110, which may be utilized by multiple users (as opposed to cellular handsets which are primarily utilized by singular individuals).

The BBS 110 may also feature a camera 115, in some embodiments. Accordingly, the BBS 110 may be configured to capture video images that are sent to a user using instant messaging technology or video chat technology. For example, the BBS 110 could be interfaced with a home automation system such that when someone approached a front door of a house where the BBS 110 resides, an image could be captured and sent to a user at a remote location to notify the user and allow for the user to view the image of the person. In addition, if a temperature sensor for the house rises above a set threshold value, a notification may be sent to the user to alert the user that the house may be on fire. In accordance with the present disclosure, other embodiments may utilize other home automation sensors.

Further, in embodiments where the BBS 110 has a camera 115 integrated into the BBS 110, images captured by the camera 115 may be monitored by the service agent 210 and motion in a region of interest in the images may be detected. If this occurs, then a video feed may be pushed automatically to a user or in response to instructions from the user (which may be in response to a notification received by the user from the service agent 210). In one embodiment, the BBS 110 may be able to store an amount of video data locally or store a larger amount on an external device or an Internet database 180. Further, in some embodiments, a log may be maintained by the BBS 110 of different video events that are captured. Such a log may also be transferred remotely to a user from the BBS 110, in accordance with the present disclosure.

Embodiments of the communication system are not limited to the examples contained herein. It is intended that the teachings of the present disclosure may be extended. For example, notification services of the communication system 100 are not limited to delivery of notifications using only instant messaging technology nor is detection services limited to detecting incoming telephone calls. For example, some embodiments of the communication system provide that the BBS 110 detects an incoming instant message for a user and notifies the user by placing a telephone call to the user and playing a prepared audio message alerting the user of the received instant message. Also, the BBS 110 may send a notification message upon receipt of a message waiting indicator (MWI) from a voicemail system.

Regarding the service agent 210, in some embodiments, the service agent 210 is an interactive instant messaging user agent represented by a software application. The service agent 210 receives messages passed from the instant messaging client 280 on the BBS 110, parses such messages, and provides instructions to perform requested services/actions, such as instructions for handling a call, requesting transmission of a call log, authorizing use of the BBS 110, etc.

Following is an example conversation between an end user and a service agent according to one embodiment. The end user initiates addressing a message to the service agent 210 using whatever means provided by the instant messaging system. Such means may comprise, for example, choosing the service agent 210 from a buddy list or addressing an email to a specific address. The message contains instructions to the service agent 210 to send a call log to the user.

In the case of a two-way messaging system, the service agent 210 may respond to the end user with information, confirmation, or with a request for additional information. In the case where additional information is requested, the end user returns to the first step and provides such information to the service agent 210. It should be appreciated that the dialog between the service agent 210 and the end user may take a variety of forms, comprising following a specific syntax, e.g. "777-666-5555 forward call," or being conversational in nature, for example, through the use of free-flowing natural language processing. The dialog can also take the form of form filling.

It should be further appreciated that the service agent 210 may proactively send messages to the end user, for example, a reminder for an event. However, it should be noted that while the service agent 210 is capable of proactively initiating communications to the end user (such as alerting and notification) for performing certain tasks, the service agent 210 is not limited to being merely reactive. The service agent 210 is capable of accepting new data. For example, the service agent 210 has the capability of accepting new rules or new changes to pre-existing rules.

Figure 3:
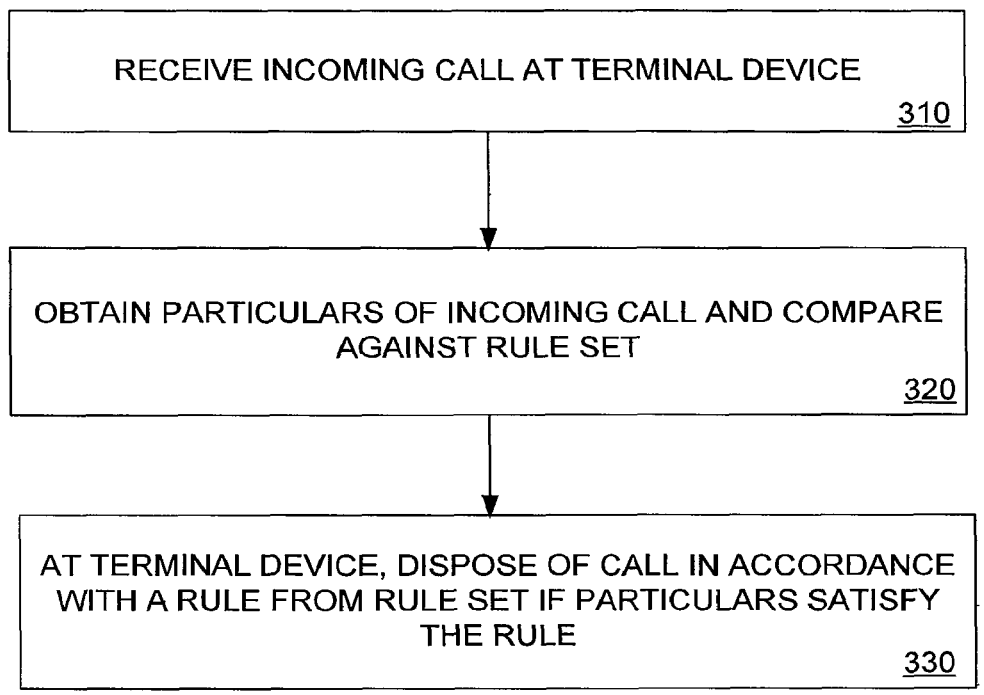
FIG. 3 is a flow chart describing one embodiment, among others, of a process performed by BBS of FIG. 2.

Referring now to FIG. 3, a flow chart describing one embodiment, among others, of a process, among others, performed by BBS 110 is shown. In block 310 of the flow chart, a terminal device, such as BBS 110, receives an incoming call. The BBS 110 obtains (320) particulars of the incoming call, such as Caller-ID information, time the call is received, etc., and compares this information against a rule set for handling incoming calls. The terminal device then disposes (330) of the incoming call in accordance with a rule from the rule set if the particulars of the call satisfy the rule set. For example, if there is a rule for incoming calls that are received before 4 p.m. and an incoming call is received at 2 p.m., then that rule would be implemented and the associated action performed.

Figure 4:
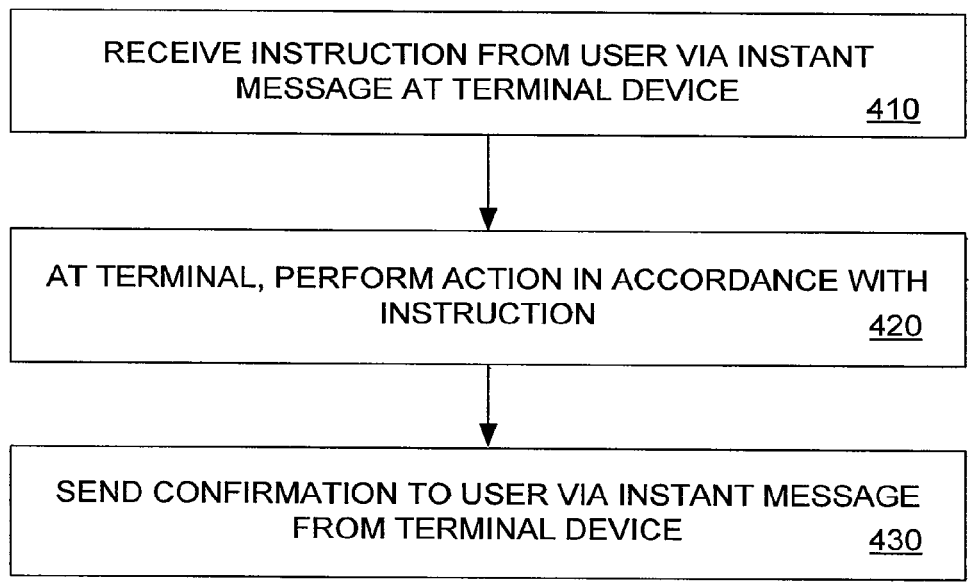
FIG. 4 is a flow chart describing one embodiment, among others, of another process, performed by BBS of FIG. 2.

Referring now to FIG. 4, a flow chart describing one embodiment, among others, of another process, among others, performed by BBS 110 is shown. In block 410 of the flow chart, a terminal device, such as BBS 110, receives an instruction from a user via an instant message. In response, the terminal device performs (420) one or more actions in accordance with the received instruction. For example, the instruction may specify that a call log should be transferred to the user, a rule should be modified, an incoming call should be disposed in a certain manner, authorization should be granted for use of the terminal device, etc. After performing the action, confirmation (430) is sent to the user, via instant message, that the instruction was received and requested action was performed, in some embodiments.

Figure 5:
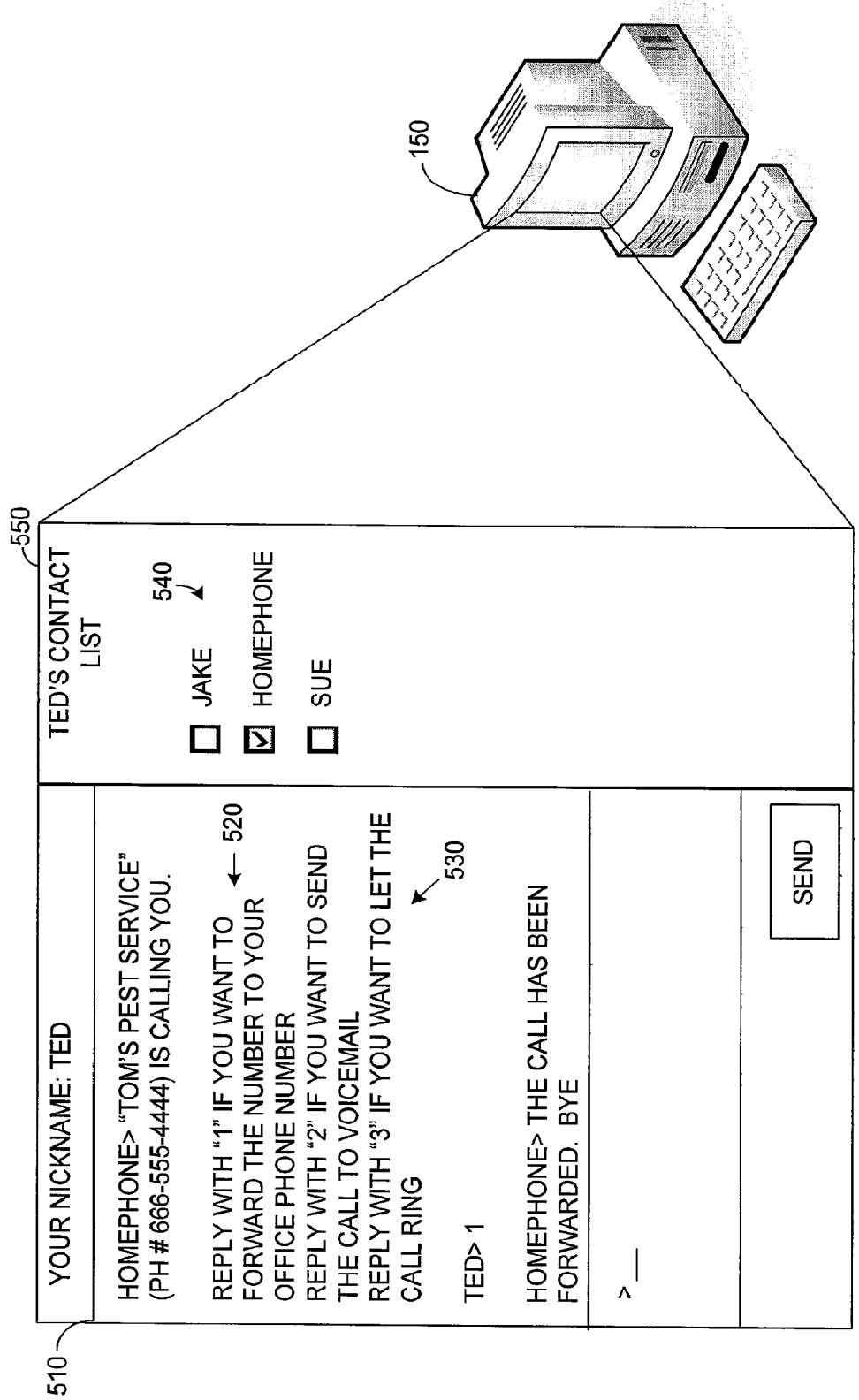

Referring now to FIG. 5, a diagram illustrating an exemplary interface to a chat client is shown. Consider that a user may have a chat session with a service agent 210 via user's chat client 510 on PC 150. Here, the service agent 210 has an identifier "HomePhone" and the user has an identifier or screen name "Ted." The user ("Ted") receives a message 520 from the service agent 210 to inform Ted that Tom's Pest Control is calling the user at the user's premises where the call is being received at BBS 110. The message 520 provides options 530 for handling the call. In particular, if Ted replies with the message "2," the service agent 210 responds by commanding the BBS 110 to send the call to a voicemail service; or if Ted replies with the message "3," the service agent lets the phone call ring without being answered. In the present example, Ted chooses to reply with "1", which causes the service agent 210 to respond by commanding the BBS 110 to forward the call to Ted's office phone number (which may be stored in an address book 230 and labeled as "Office Phone Number," in one embodiment).

Figure 6:
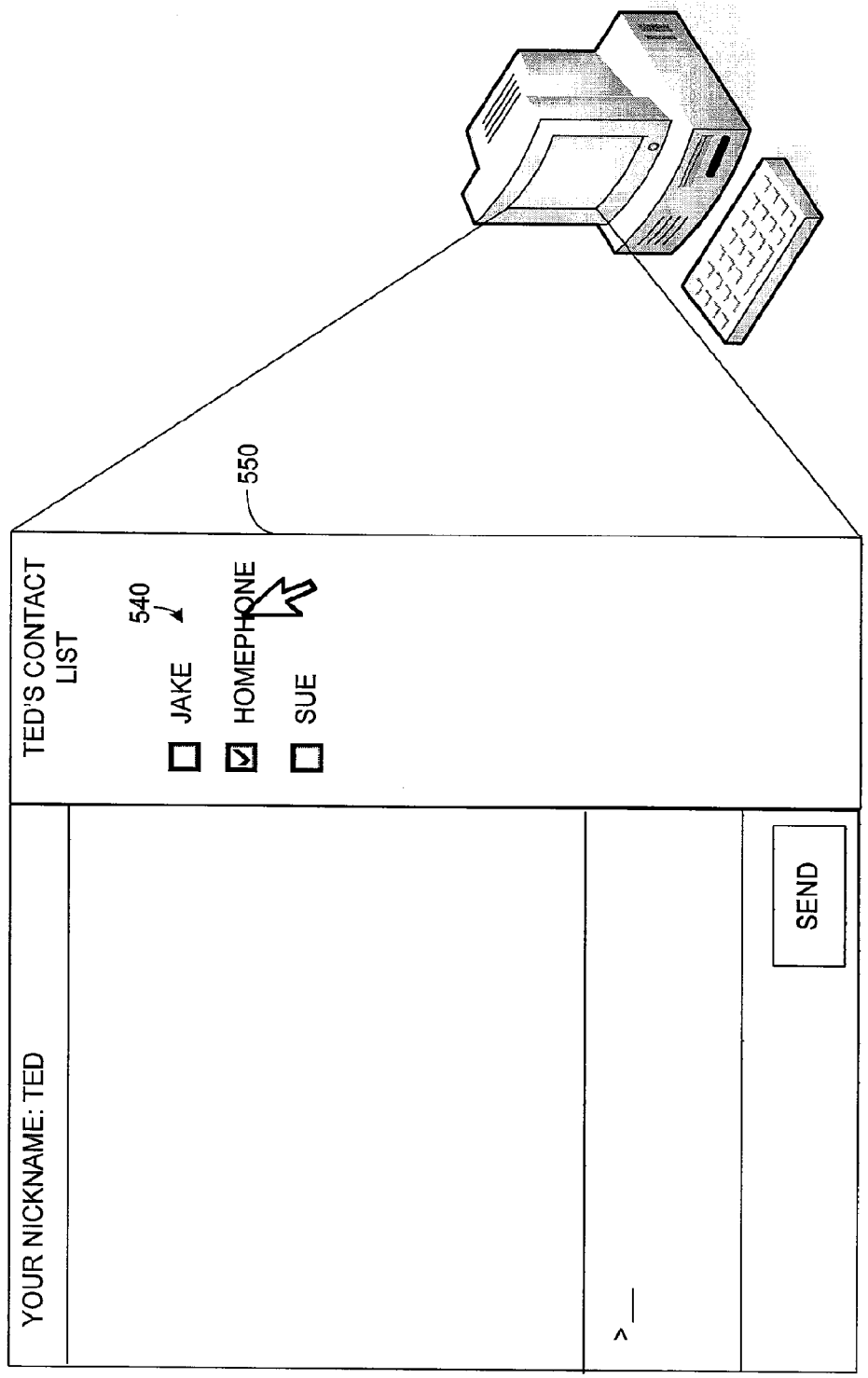
Figure 7:
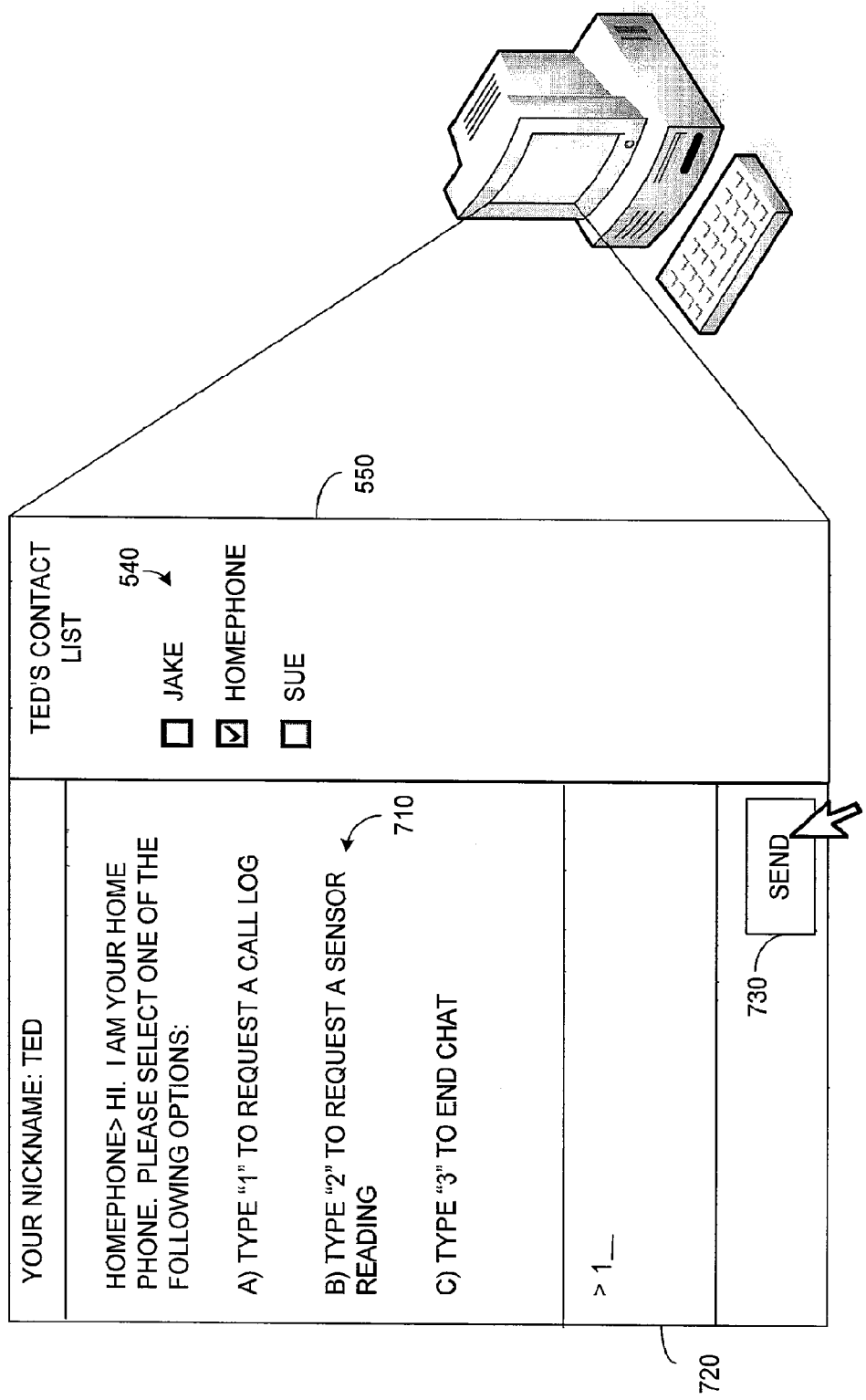

In the chat client 510 of FIG. 5, it is shown that the service agent's identity is listed as a contact 540 in Ted's Contact List 550. Therefore, Ted can initiate communications with the "HomePhone" identity by selecting one or more of the contacts (as represented in FIG. 6) from his contact list 550 which will cause a chat window to open (if one is not already opened), in one embodiment. In FIG. 7, after Ted has clicked on the contact identity of the service agent 210, the service agent 210 responds with options 710, such as requesting a call log for BBS 110, requesting a sensor reading, such as the temperature of the house where the BBS 110 resides, as mentioned previously, or ending the chat session with the contact identity. It is noted that a number of different options may be provided and that the options described herein are provided as illustrative examples and are not intended to be limiting.

Figure 9:
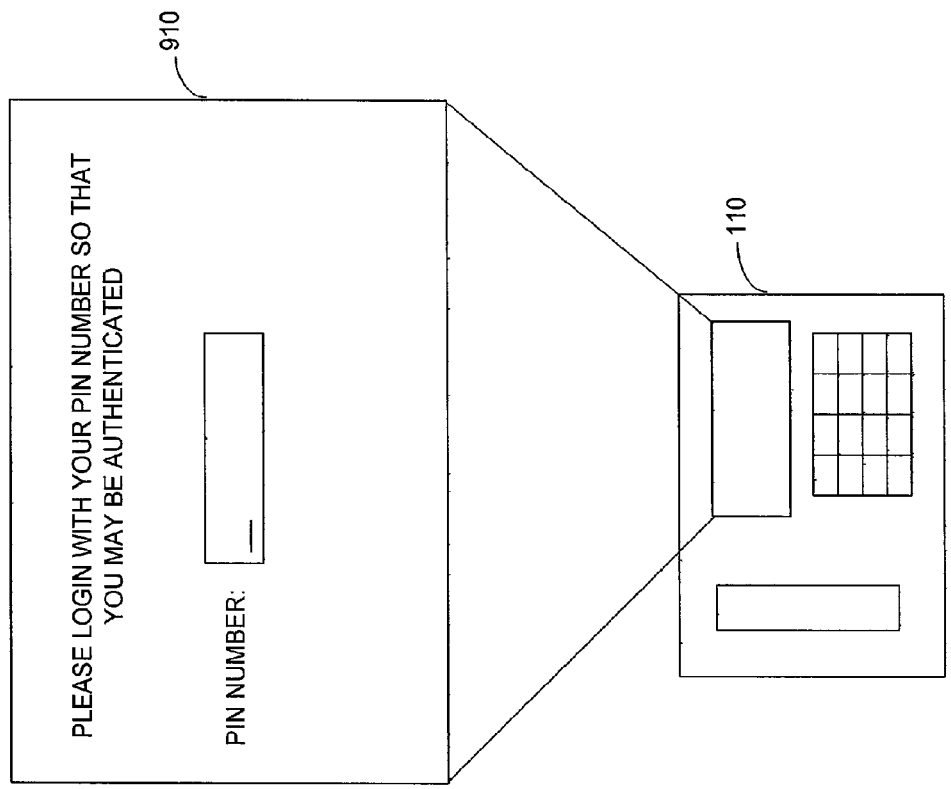
FIG. 9 is a diagram illustrating an exemplary log-in interface to the BBS of FIG. 2.

Referring back to FIG. 7, Ted responds by typing "1" in the input window 720 and selects the send button 730. As a result, in the illustrative example of FIG. 8, contents of a call log 910 are sent, in response to his reply, and are displayed as part of a chat session. The call log contents 910 indicate that a call from Sue was received at 9:00 AM, where Sue left a voicemail. At 11:12 AM, the call log shows that a call was received from an unknown or unidentified party and the call was forwarded to voicemail but the party did not leave a voicemail message. At 2:12 PM, the call log shows a call was received from "Mother" and the call was answered by "Daughter." The call lasted 23 minutes. It is noted that the identity Mother or Sue may be identifiers set up by the user (Ted) in his address book for certain telephone numbers. Further, "Daughter" may be an identity established on the BBS for a user having a particular PIN that is used as a login for the BBS 110, such as the exemplary illustration of FIG. 9 which shows a log-in interface 910 to BBS 110.

Figure 10:
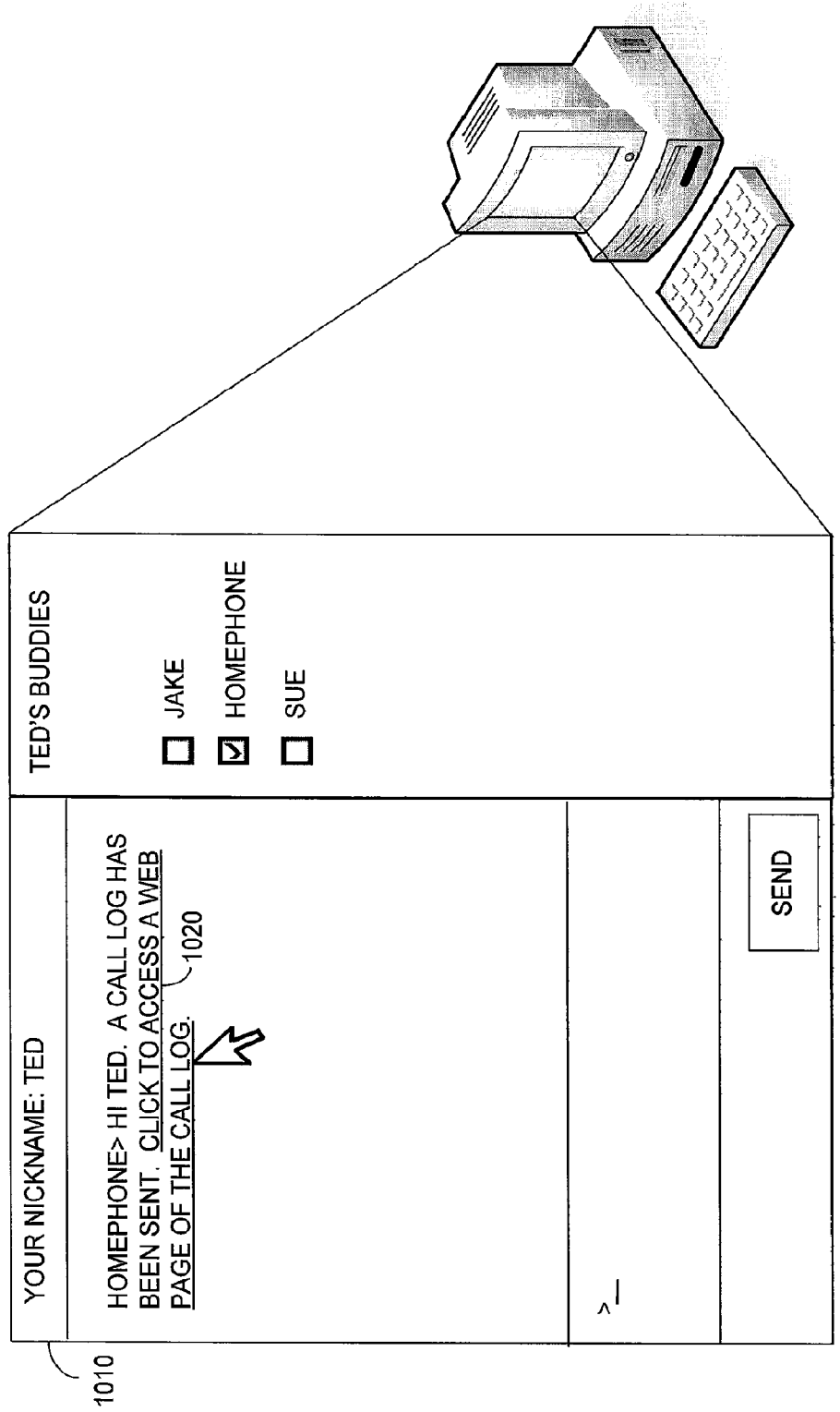
FIG. 10 is a diagram illustrating an exemplary interface to a chat client communicating with the BBS of FIG. 2.
Figure 11:
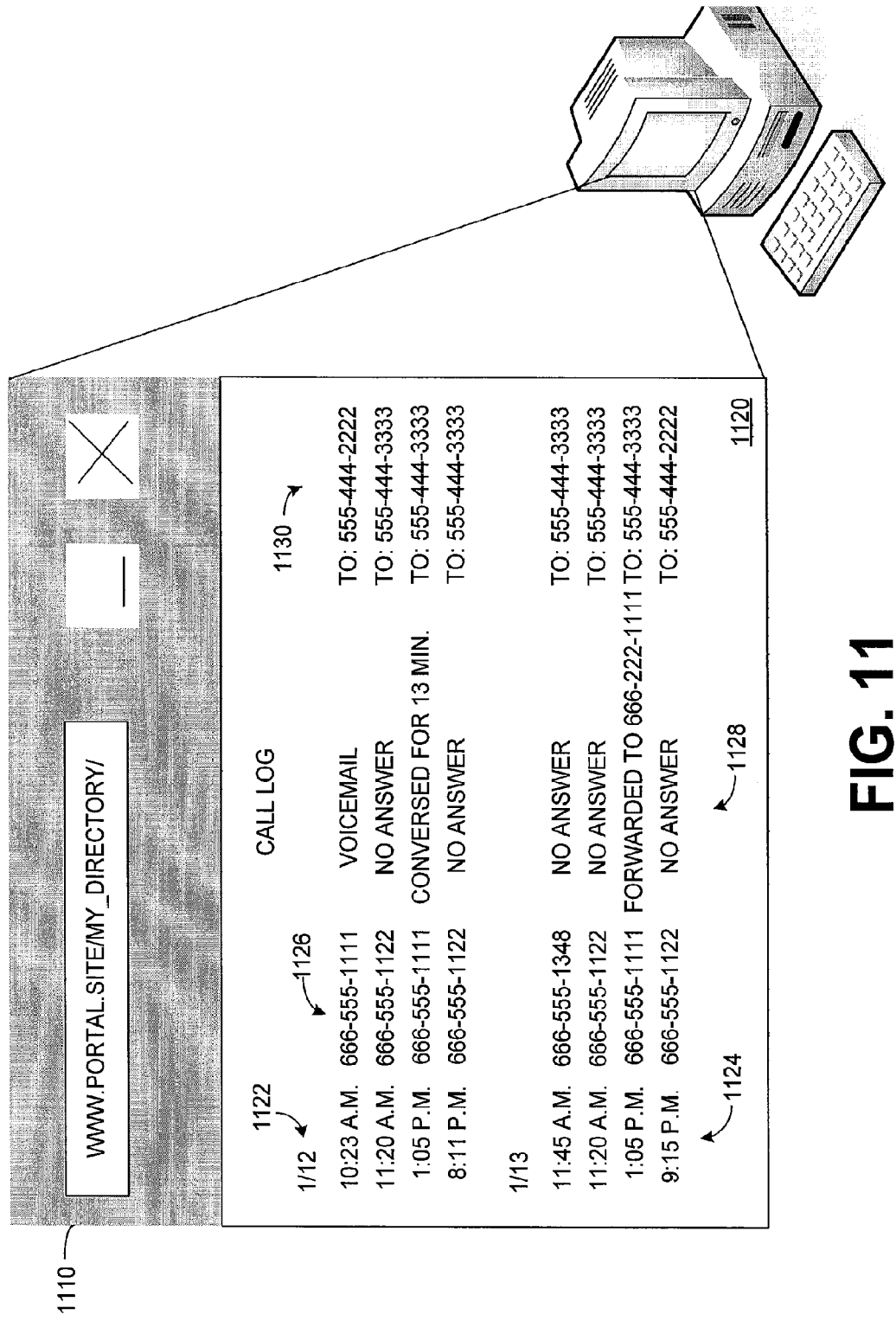
FIG. 11 is diagram of an exemplary call log made accessible on the web by the BBS of FIG. 2.

Referring back to FIG. 8, the call log contents 910 further indicate that an outgoing call was placed on the BBS 110 from Daughter to Ted, and this call lasted 20 seconds. In an alternative embodiment, a hyperlink 1020 to the call log may be included in a chat message from the HomePhone identity of the service agent 210. For example, FIG. 10 shows a chat client interface 1010 displaying a message with a hyperlink 1020 to access a call log. In one embodiment, by clicking on the hyperlink 1020 with a mouse control, a web browser client 1110 is activated, as shown in FIG. 11.

In the present example, call log contents are displayed as a web page 1120. The call log contents include date information 1122, timing information for receipt of calls 1124, the telephone numbers of the call that was received 1126, a status of disposition for the calls 1128, and to what phone numbers calls were made 1130. For example, in one embodiment, a user may have more than one BBS 110 that feeds a call log database (e.g., database 180) stored in a network location.

Therefore, a single call log may compile information from multiple BBS devices 110. Also, in some embodiments, additional information may be included as call log contents, include outgoing call information. Therefore, the present example is not intended to be limiting.

Figure 12:
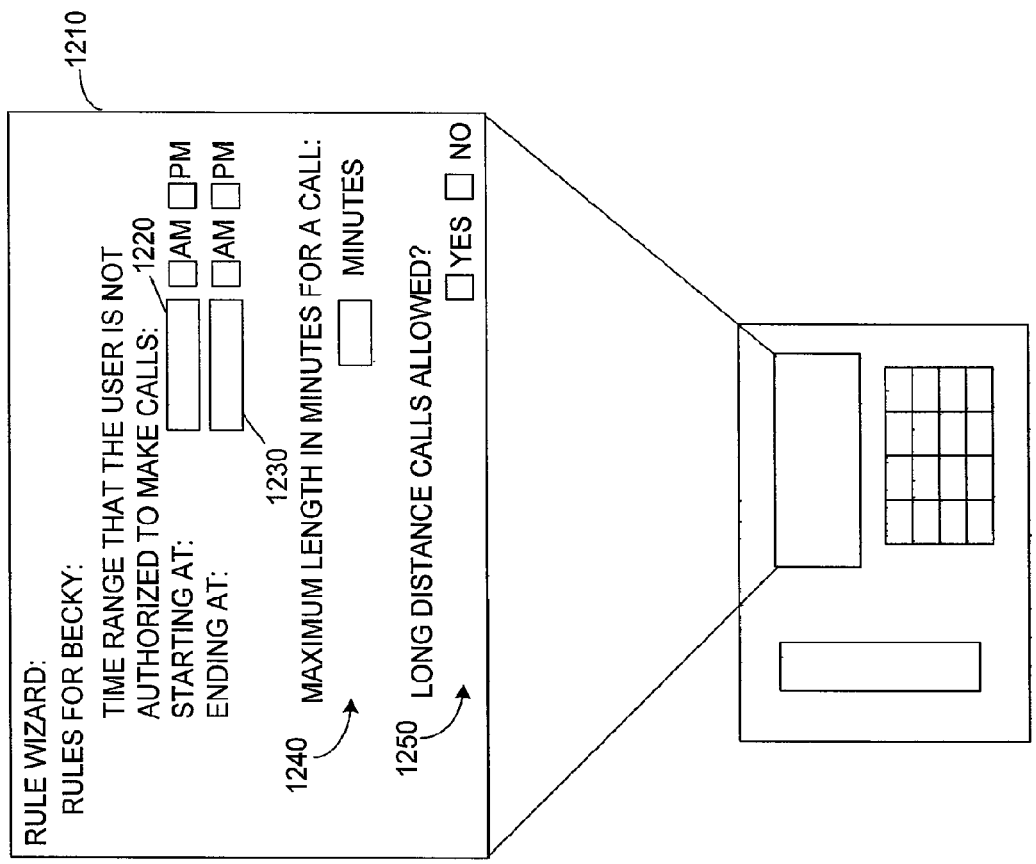
FIG. 12 is a diagram illustrating an exemplary interface to the BBS of FIG. 2 that allows for formation of rules implemented by the BBS.

In one embodiment, a user can define rules that affect how BBS 110 handles incoming and outgoing telephone calls or other services provided by the BBS 110. FIG. 12 illustrates an exemplary interface 1210 to BBS 110 that allows formation of rules via the BBS device 110.

In the present example of FIG. 12, the user creates rules for "Becky" which is assumed to be another user of the BBS 110. Here, the user operating the BBS 110 can specify a time range in which Becky is not authorized to make calls using BBS 110. To specify the time range, the user can input a starting time 1220 and an ending time 1230 for the time range. Further, in the present example, the user can specify a maximum length in minutes 1240 of a duration of a call for Becky. Also, it is specified if Becky is allowed to make long distance calls or not. A wide variety of rules may be configured in accordance with embodiments of the present disclosure. The examples described above are meant to be illustrative and not intended to be limiting. Additional rules are contemplated in additional embodiments.

Figure 13:
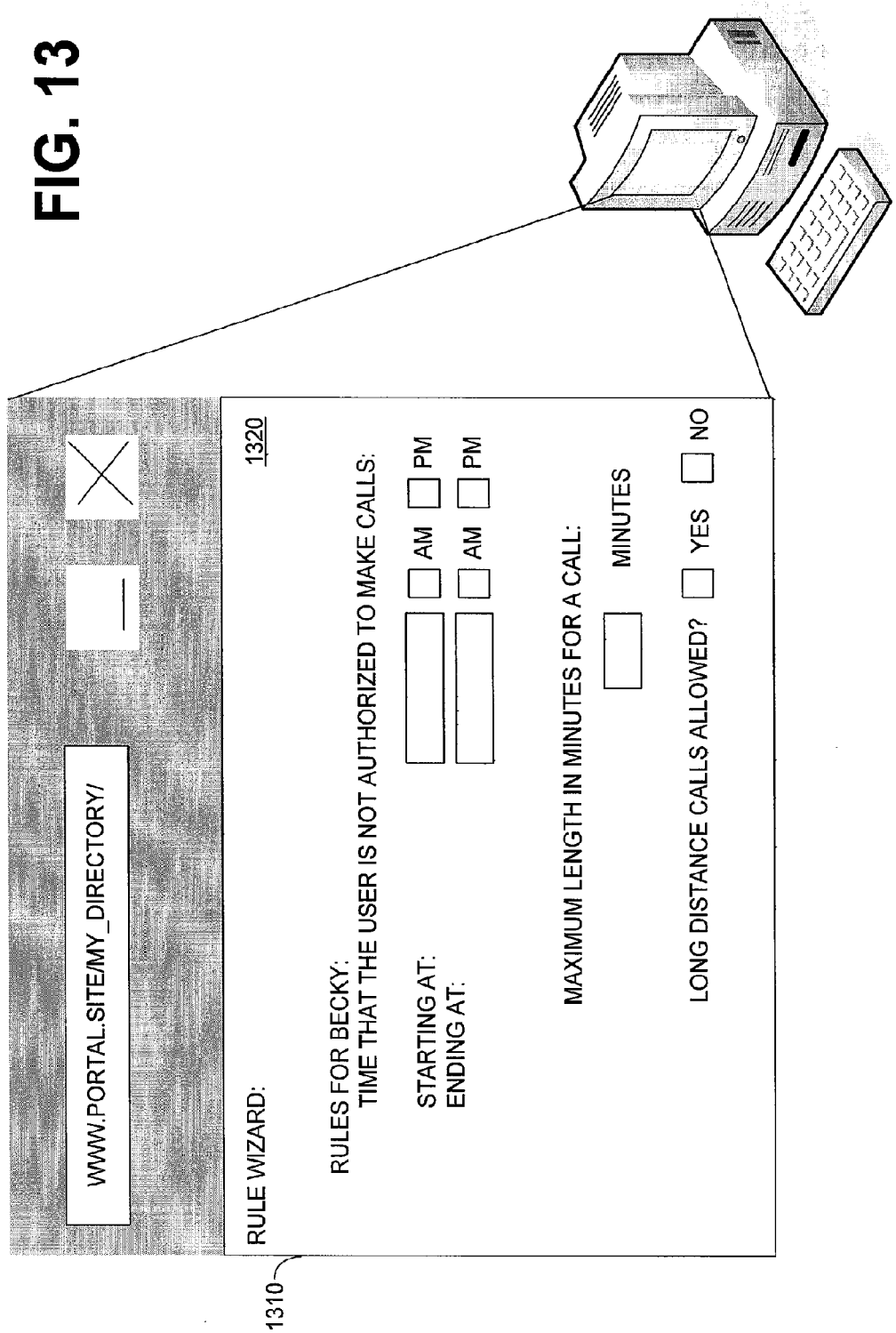
FIGS. 13-14 are diagrams illustrating an exemplary web interface that allows for formation of rules implemented by the BBS of FIG. 2.

In addition to configuring rules via a BBS interface, one embodiment provides for a web-based interface for configuring rules, as shown in FIG. 13. Accordingly, a user may access a web page 1320 via a browser interface 1310 and configure rules determining how BBS 110 handles incoming and outgoing calls, or other services provided by the BBS 110. The rules may be stored in a network database (e.g., database 180) that is accessed and implemented by BBS 110, in one embodiment.

Figure 14:
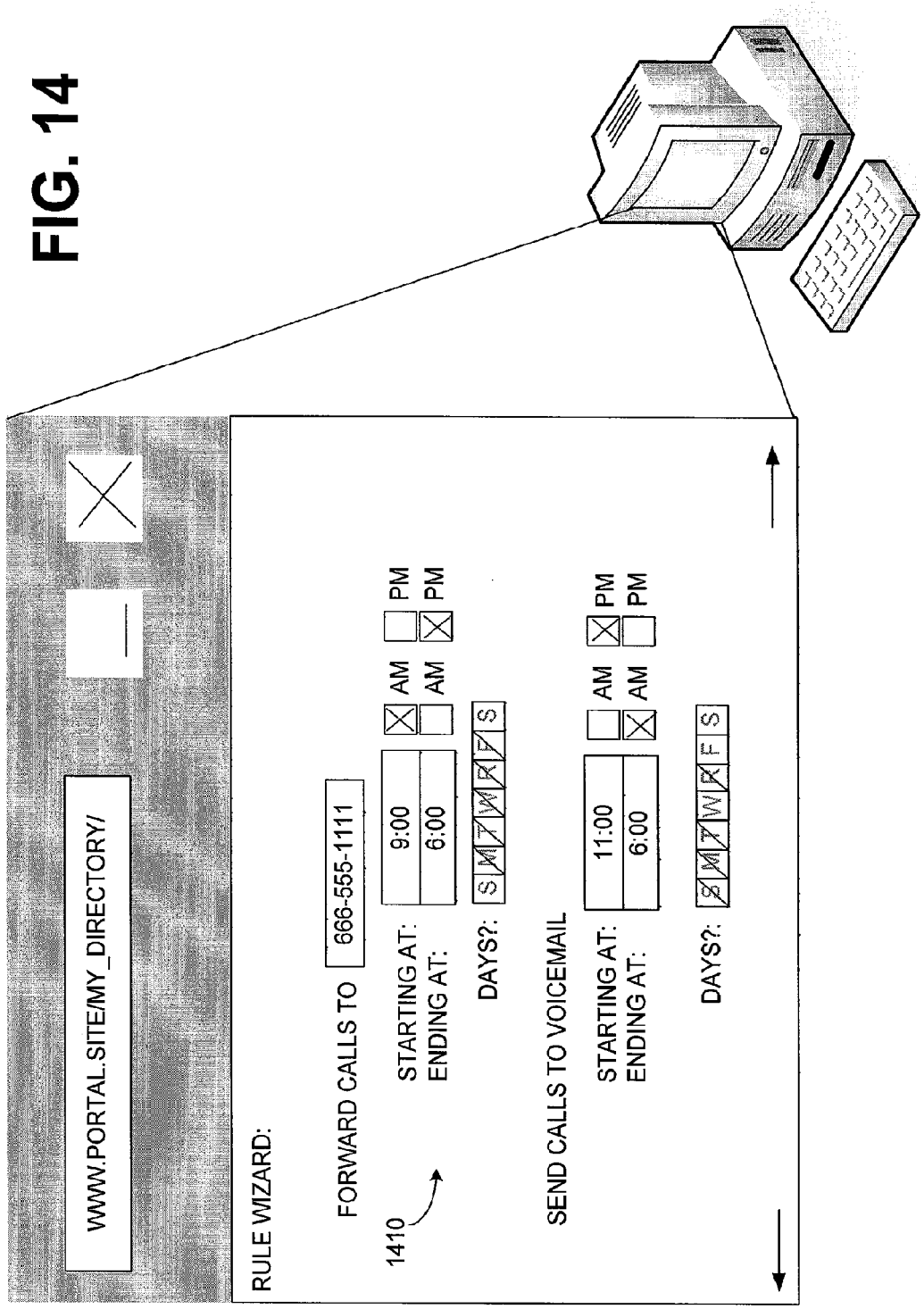

In addition to rules being configured for particular users, general rules may also be configured that are applied as general rules to the BBS 110 for all users. For example, in the exemplary interface of FIG. 14, a rules wizard is provided for defining rules. In particular, the present example shows rules being created and stating that all calls received by the BBS 110 from 9 AM to 6 PM are automatically to be forwarded to the phone number 666-555-1111 if the call is received on a Monday, Tuesday, Wednesday, Thursday, or Friday, as indicated by the stipulations 1410 provided by a user. Further, a set of rules may state that incoming calls are automatically sent to voicemail for the time period corresponding to 11 PM to 6 AM on Sunday, Monday, Tuesday, and Thursday. As noted previously, a wide variety of rules may be configured in accordance with embodiments of the present disclosure. The examples described above are meant to be illustrative and not intended to be limiting. Additional rules are contemplated, in one embodiment.

Figure 15:
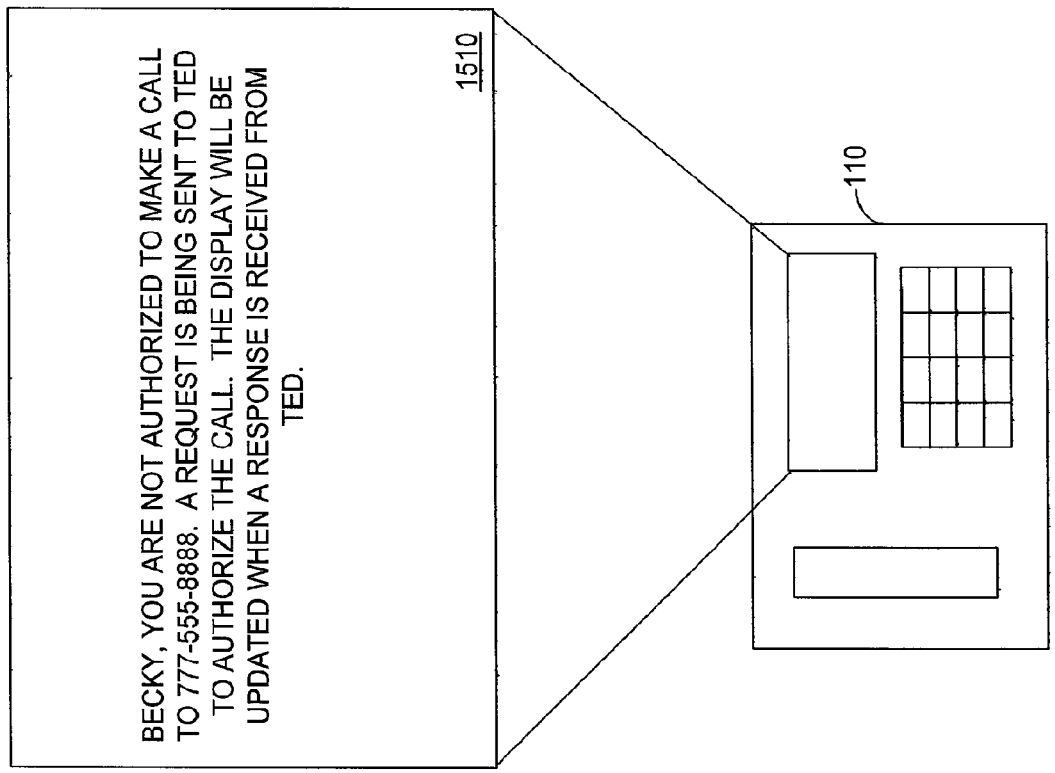
FIG. 15 is a diagram illustrating an exemplary interface to the BBS of FIG. 2 such that a message is displayed to a user.
Figure 16:
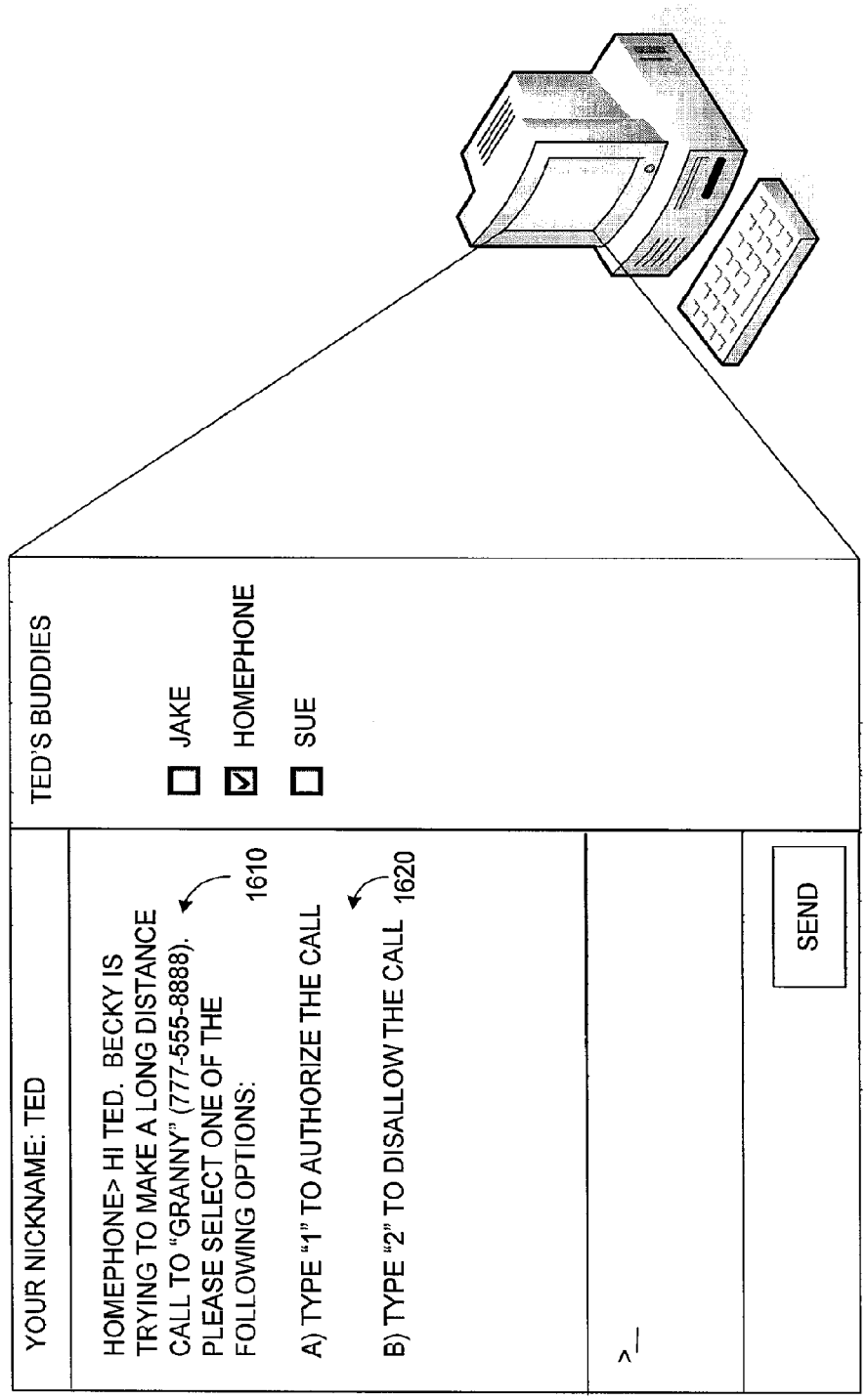
FIGS. 16-17 are diagrams illustrating an exemplary interface to a chat client communicating with the BBS of FIG. 2.

If a user, such as Becky in the previous illustrations, attempts to access a service or function of the BBS 110 that has a rule disallowing such service/function, the BBS 110 will prohibit the service/function from being performed, in one embodiment. For example, in the exemplary illustration of FIG. 15, the BBS 110 may display a message 1510 informing Becky that she is not authorized to make a call to the telephone number 777-555-8888. In response, the BBS 110 may be configured to send an instant message (or other type of message) to Ted, who has the authority to grant Becky access to prohibited services or functions. In the example of FIG. 16, Ted is sent a chat message 1610 to a chat client of Ted's. To do so, a user may configure settings in the BBS 110 indicating that messages asking for permission to perform prohibited activities be sent to a particular messaging address, such as Ted's chat address, in the present embodiment.

The message 1610 indicates that Becky is attempting a long distance call to phone number 777-555-8888 which is identified as belonging to "Granny" (which may be an identifier associated with the number in address book 230), in one embodiment. Also, Ted is provided options 1620 in the message 1610 for authorizing the call or disallowing the call, in one embodiment.

Figure 17:
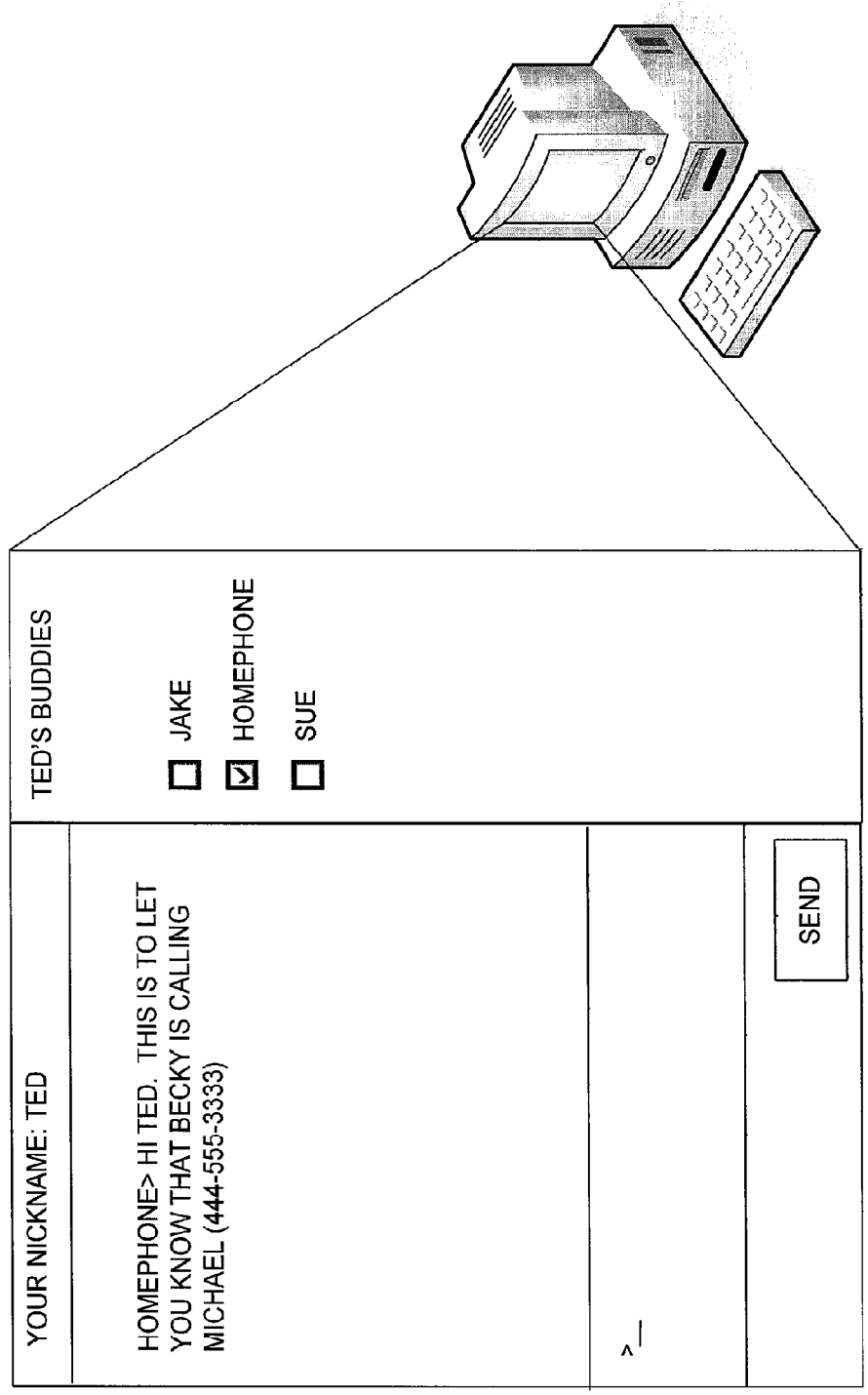

Rules may also be specified, in some embodiments, for providing notification messages of user operations on the BBS 110. For example, FIG. 17 shows a sample chat message informing a user (Ted) that another user (Becky) is utilizing the BBS 110 to make a telephone call to telephone number 444-555-333 which is associated with Michael. In this way, Ted can monitor Becky's use of the BBS 110 remotely via chat messages (or other messages) sent by the BBS 110. Further, in alternative embodiments, email messages or even voice messages may be sent by BBS 110 to notify a user of uses being made of the BBS 110.

Figure 18:
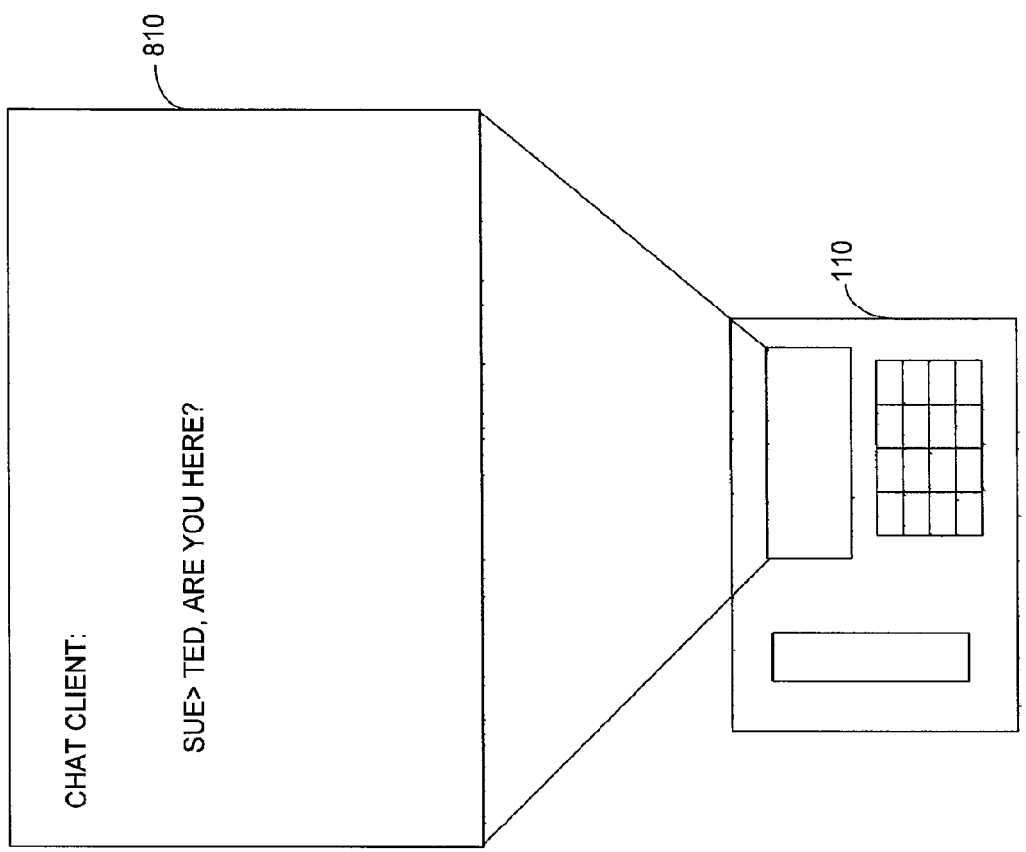
FIGS. 18-19 are diagrams illustrating an exemplary interface to the BBS of FIG. 2 that allows for chat communications.

Also, the BBS 110 can notify a user of received messages. For example, in one embodiment, the BBS 110 provides an IM client 280. The IM client 280 may receive an instant message 1810, as shown in FIG. 18. In the present example, a user (Sue) has sent the message "Ted, are you here?." Ted may, in fact, not be available to respond to the message 1810 via the BBS 110. However, in one embodiment, the BBS 110 may be configured to notify a user (e.g., Ted) that he or she has received a message at the BBS 110.

Figure 19:
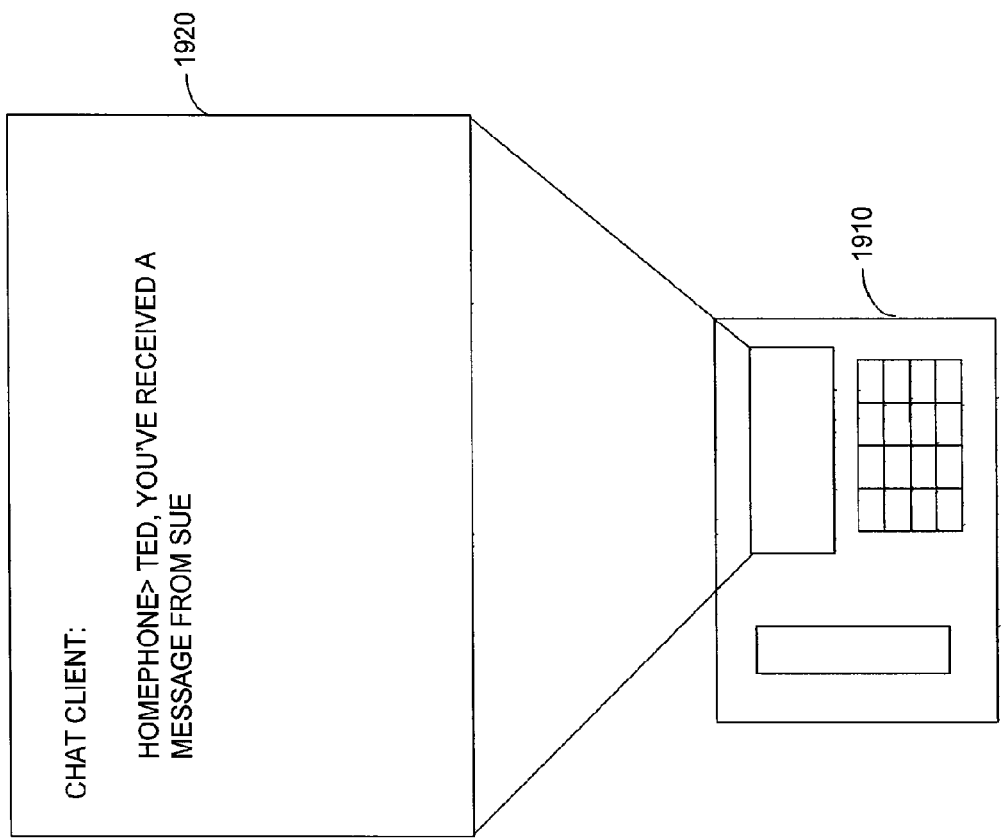

For example, Ted may be at his office where another BBS device resides. Therefore, the BBS 110 at his home may send a notification message to a network address designated by the user corresponding to the BBS at his office. Accordingly, in the example of FIG. 19, an instant message 1920 is sent to Ted's other BBS device 1910 notifying him that a message from Sue has been received.

Figure 20:
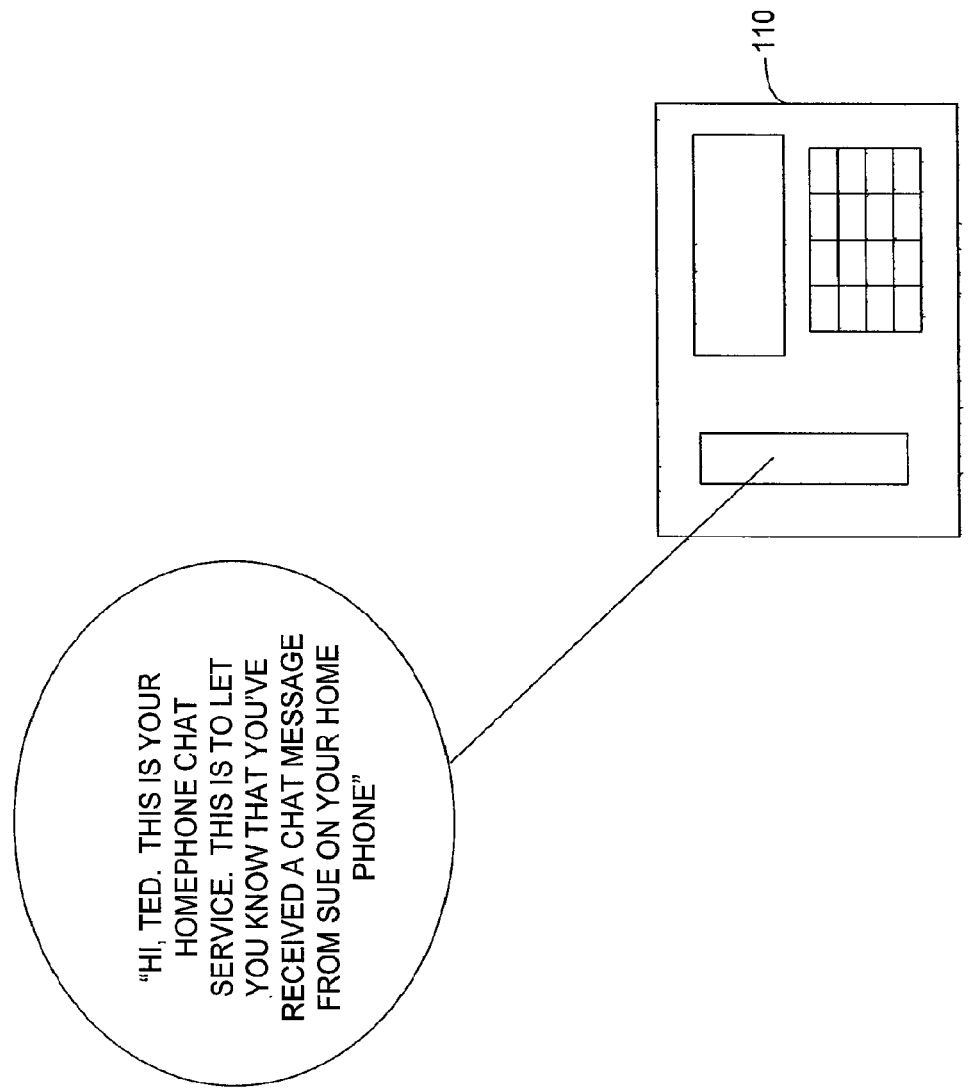
FIG. 20 is a diagram illustrating a capability of the BBS of FIG. 2 that allows for voice notification messages to be generated.

However, in the example of FIG. 20, an audio or voice message is sent to Ted's other BBS device 1910 (or a general telephone device) to play a voice message from BBS 110 (at his home) notifying Ted that an instant message from Sue has been received. It is noted that in the present example the BBS 110 identifies itself as a "HomePhone Chat Service" in the voice message and as "HomePhone" in the instant message.

In addition to notifying users of received messages, an embodiment of BBS 110 can also provide notification or update messages containing captured images. For example, a camera 115 (e.g., digital camera) may be integrated into the BBS 110 via a network 120, where the camera may be located at an entrance to a user premises, such as a door, for example. The BBS 110 may have a camera application 260 that can grab an image frame from the camera 115 at a preset interval (e.g., every 30 seconds) or upon occurrence of an event (e.g., motion detection). The camera application 260 may then transfer the image to another location for viewing. For example, the camera application may convert the image into a JPEG (Joint Photographic Experts Group) image file and upload the image to a web server using file transfer protocol (FTP).

Camera 115 may be connected to network 120 using wired or wireless connections. BBS 110 is also a wireless DSL router, in one embodiment, to facilitate wireless communications.

Further, in one embodiment, a user may communicate with camera application 260 remotely using instant messaging or other messaging techniques. For example, a user may remotely provide commands for adjusting pan/tilt positions of a camera lens and program frame-capture settings based on the position of the camera, in one embodiment. Also, camera 115 may be programmed to take a new picture when it detects motion across a camera lens.

Figure 21:
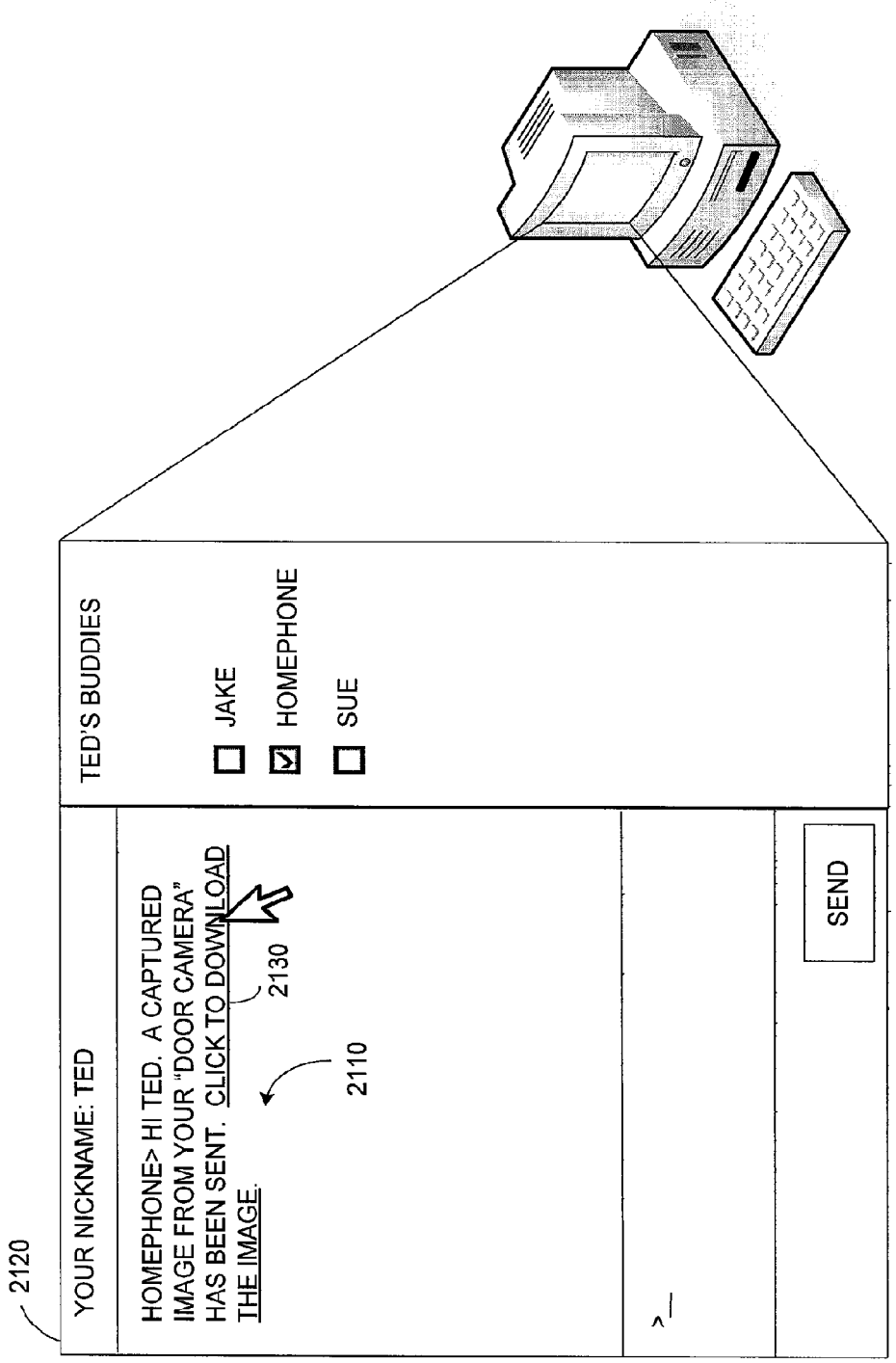
FIGS. 21-23 are diagrams illustrating an exemplary interface to a chat client communicating with the BBS of FIG. 2.
Figure 22:
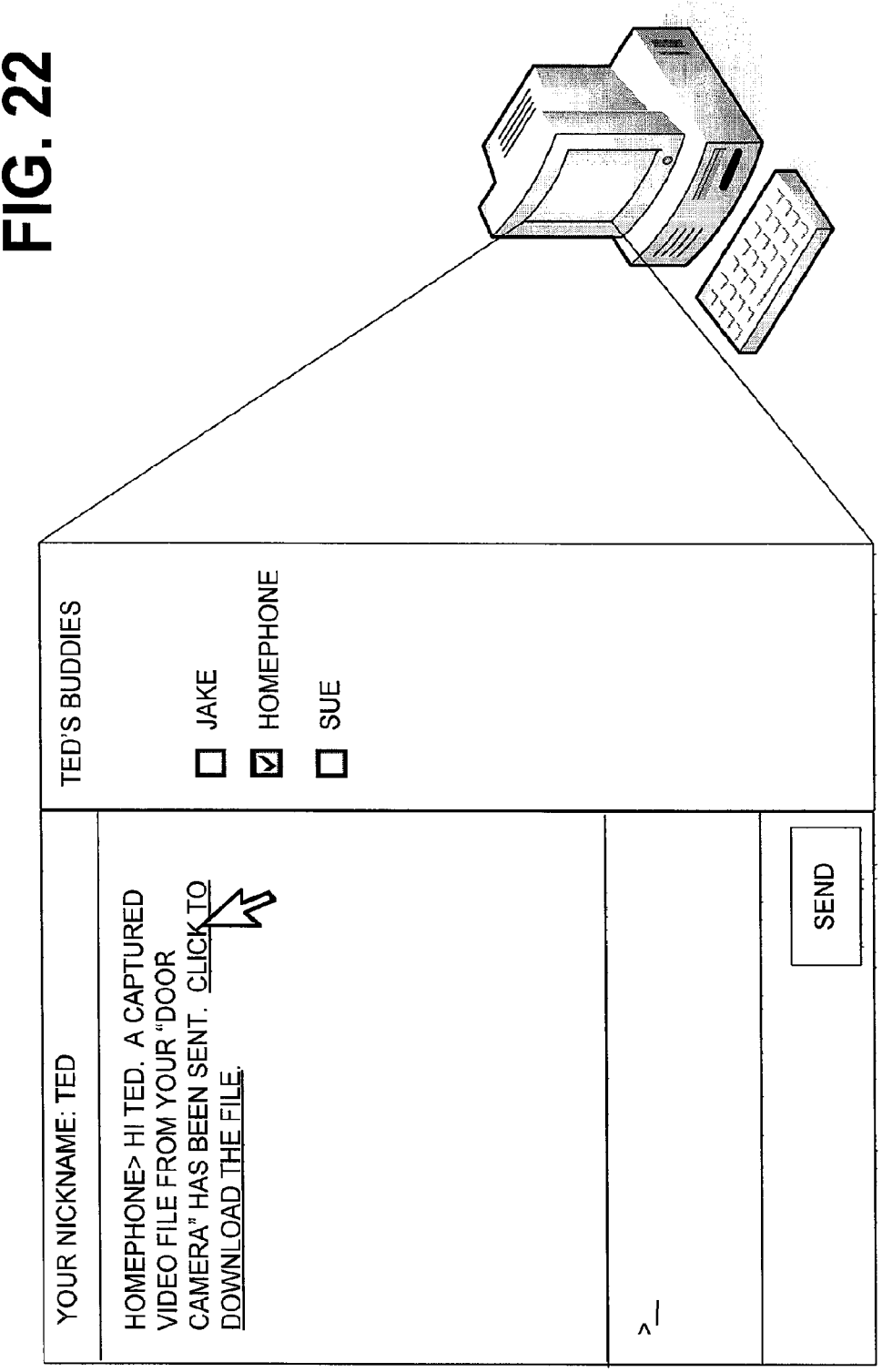

In one embodiment, the camera 115 may be configured to capture images whenever it detects a person approaching the door (where camera lens is positioned or directed). In response, the BBS 110 may receive the images or be notified of the images so that the BBS 110 can make the image available to a user at a remote location. In the example of FIG. 21, a chat message is sent to a chat client 2120 of the user in a remote location. The chat message 2110 includes a hyperlink 2130 to the captured image that is stored at a network location. Also, in some embodiments, the camera 115 may capture video, where the BBS 110 makes the video accessible to a remote user, as shown in FIG. 22.

Figure 23:
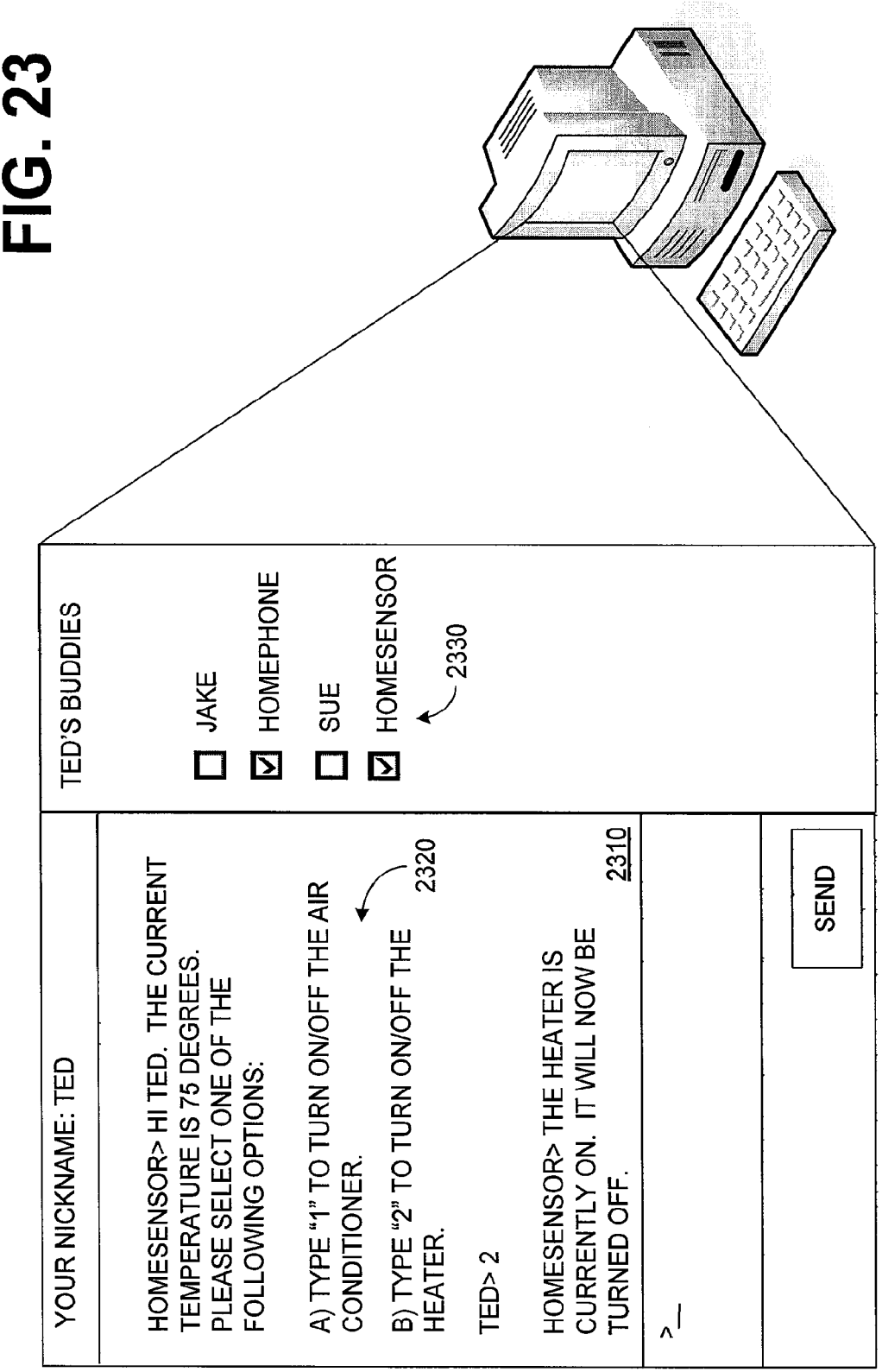

Other devices may cause notification messages to be sent, in some embodiments. For example in FIG. 23, a remote user of the BBS 110 receives a chat message 2310 from the BBS 110 informing the user the current temperature of a house (via a temperature sensor reading) where the BBS 110 resides and provides options 2320 for turning on/off an air conditioner to the house or turning on/off a heater to the house. It is noted that a control unit to a home automation system may be integrated with the BBS 110 via network 120, in one embodiment. Accordingly, the home automation system may be provided its own contact identity 2330 (e.g., "HomeSensor") and may have a service agent installed on the BBS 110 that acts on its behalf. Therefore, a user can communicate remotely with the home automation system via the contact identity and issue commands, such as a command to turn off a heater, as illustrated in FIG. 23. In accordance with embodiments of the present disclosure, a variety of devices may be configured to communicate via the BBS 110. The examples described above are meant to be illustrative and not intended to be limiting.

Embodiments of the BBS 110 utilize the many features of home networks and broadband Internet capabilities and further provides communication and information functions and services in a novel and unique approach.

Figure 24:
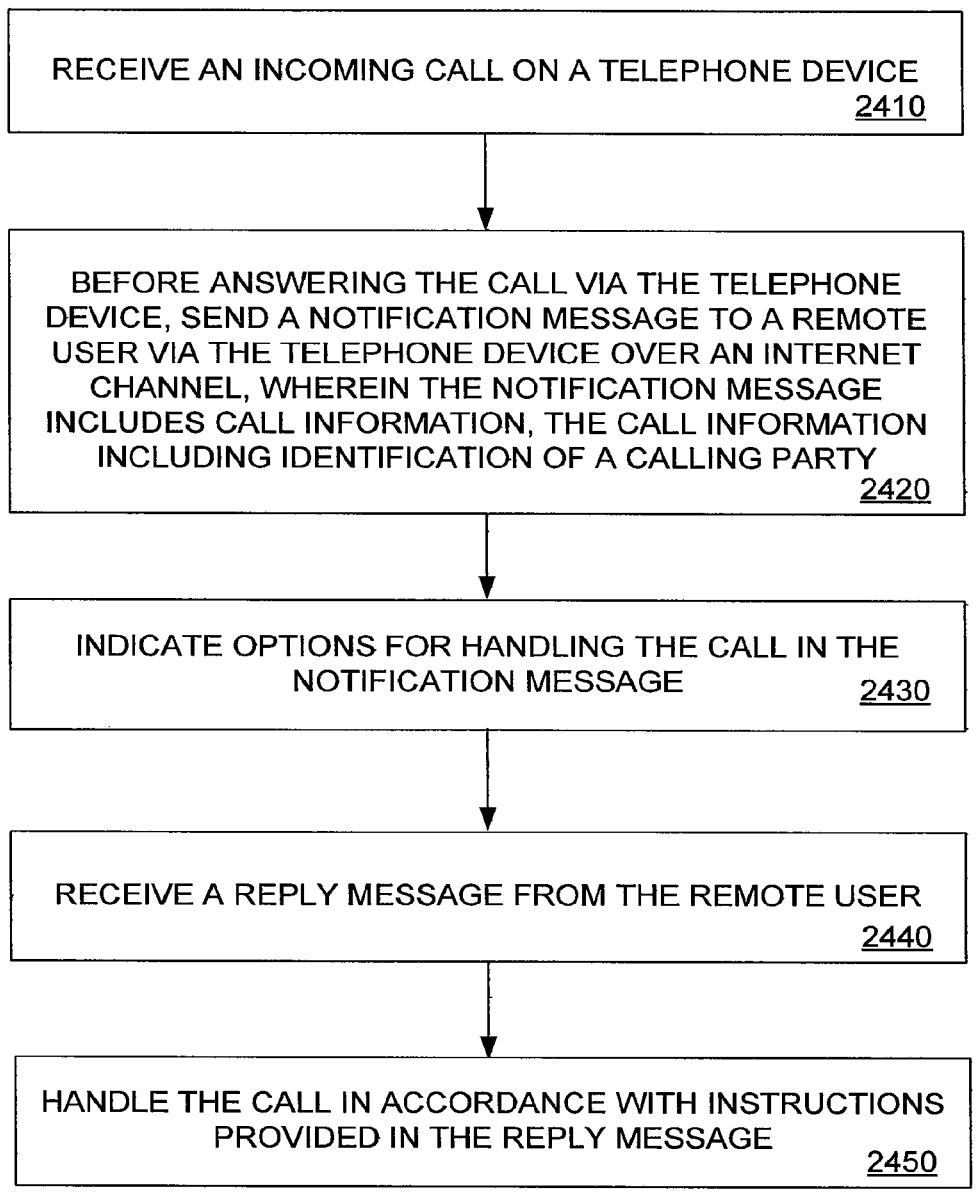
FIG. 24 is a flow chart describing one embodiment of a method of call notification.

Referring now to FIG. 24, a flow chart describing one embodiment of a method of call notification is depicted. The method includes receiving (2410) an incoming call on a telephone device and before answering the call via the telephone device, sending (2420) a notification message to a remote user via the telephone device over an Internet channel, wherein the notification message includes call information, the call information including identification of a calling party. In one embodiment, the notification message is an instant message, among others. Further, the call information comprises a time when the call was received by the telephone device, in one embodiment. The notification message also may indicate (2430) options for handling the call. As such, the method further includes receiving (2440) a reply message from the remote user, and handling (2450) the call in accordance with instructions provided in the reply message.

Figure 25:
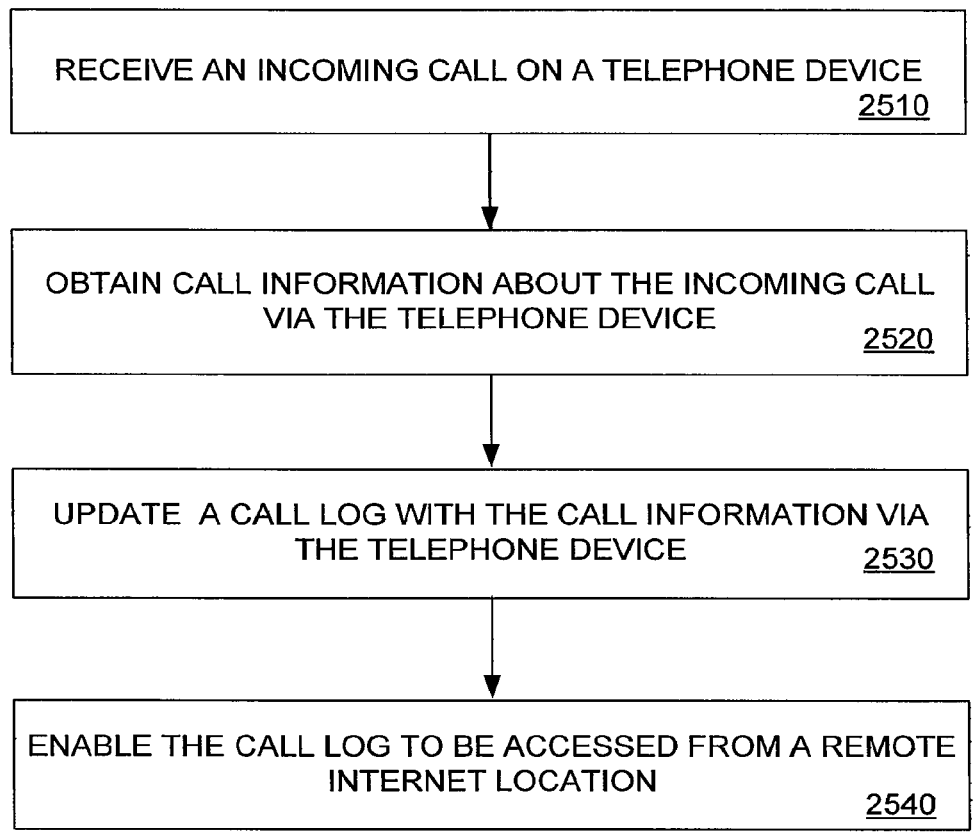
FIG. 25 is a flow chart depicting one embodiment of a method for maintaining a call log.

The flow chart of FIG. 25 depicts one embodiment of a method for maintaining a call log. As such, the method includes receiving (2510) an incoming call on a telephone device and obtaining (2520) call information about the incoming call via the telephone device. The method further includes updating (2530) a call log with the call information via the telephone device and enabling (2540) the call log to be accessed from a remote Internet location. In one embodiment, the telephone device receives calls from a PSTN network. Further, in the same embodiment or another embodiment, the telephone device may be configured to receive calls from the Internet. Also, the electronic message may be sent to a remote user with the call log as an attachment to the electronic message, in one embodiment. Alternatively, an electronic message is sent to a remote user with a hyperlink for accessing a web page displaying contents from the call log, in one embodiment.

Figure 26:
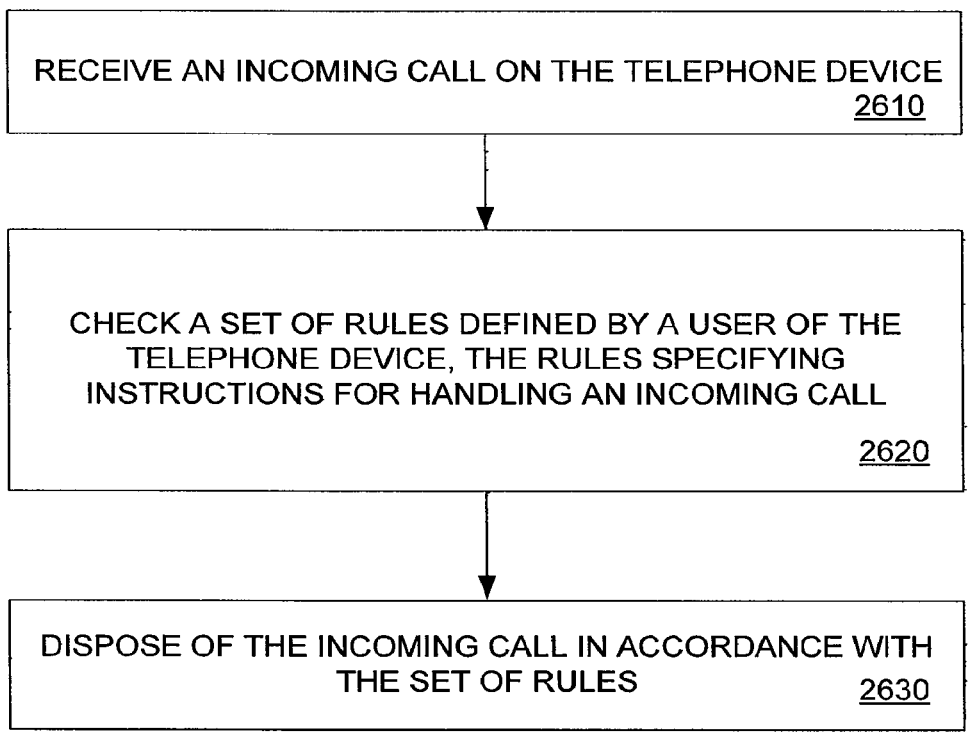
FIG. 26 is a flow chart illustrating one embodiment of a method of establishing communications with a telephone device, such as the BBS of FIG. 2.

Referring now to FIG. 26, a flow chart illustrating one embodiment of a method of establishing communications with a telephone device is shown. The method includes receiving (2610) an incoming call on the telephone device and checking (2620) a set of rules defined by a user of the telephone device, the rules specifying instructions for handling an incoming call. The method further includes disposing (2630) of the incoming call in accordance with the set of rules. In one embodiment, the set of rules includes a rule instructing the telephone device to forward the incoming call to the user if a telephone number of a calling party is contained in an address book of the user. Further, in one embodiment, the set of rules includes a rule instructing the telephone device to perform a particular action if the incoming call to the user is received within a designated time frame. The particular action may also involve sending a notification message to the user at a remote location notifying the user of the incoming call, in one embodiment.

Figure 27:
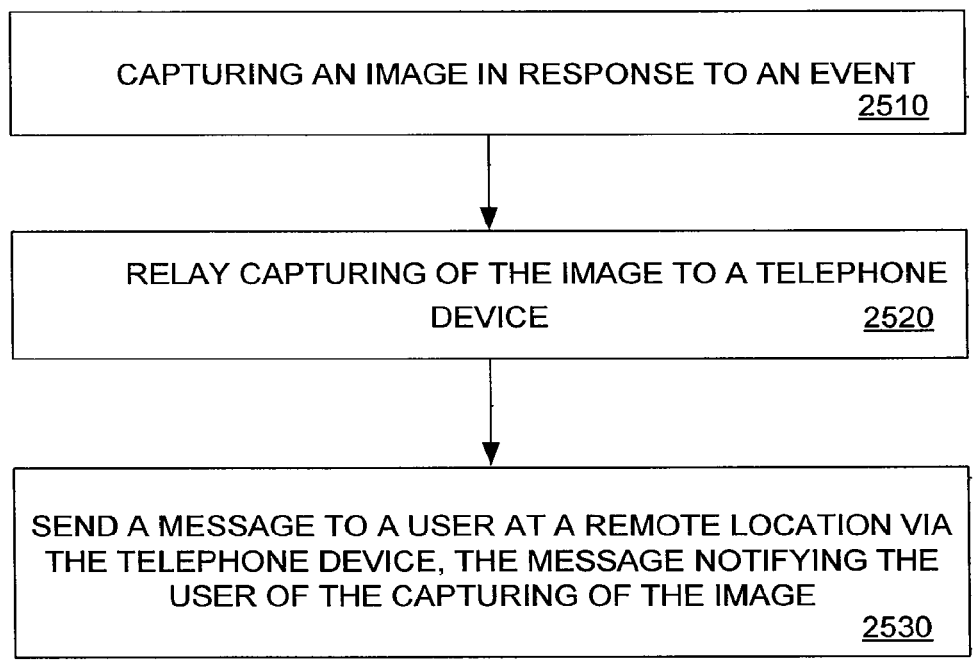
FIG. 27 is a flow chart describing one embodiment of a method of notification using the BBS of FIG. 2.

The flow chart of FIG. 27 describes one embodiment of a method of notification. The method includes capturing (2710) an image in response to an event and relaying (2720) the capturing of the image to a telephone device. The method further includes sending (2730) a message to a user at a remote location via the telephone device, the message notifying the user of the capturing of the image. In one embodiment, the message includes a hyperlink to the captured image. Further, in one embodiment, the event comprises conversing on a handset of the telephone device and the user is a calling party (e.g., an image being sent of one party conversing on a telephone to another party conversing on a telephone). Alternatively, in one embodiment, the event comprises detection of motion by a camera that captured the image. The message notifying the user may comprise a voice message made from the telephone device over a PSTN network or a voice message made from the telephone device over the Internet, in one or more embodiments.

Figure 28:
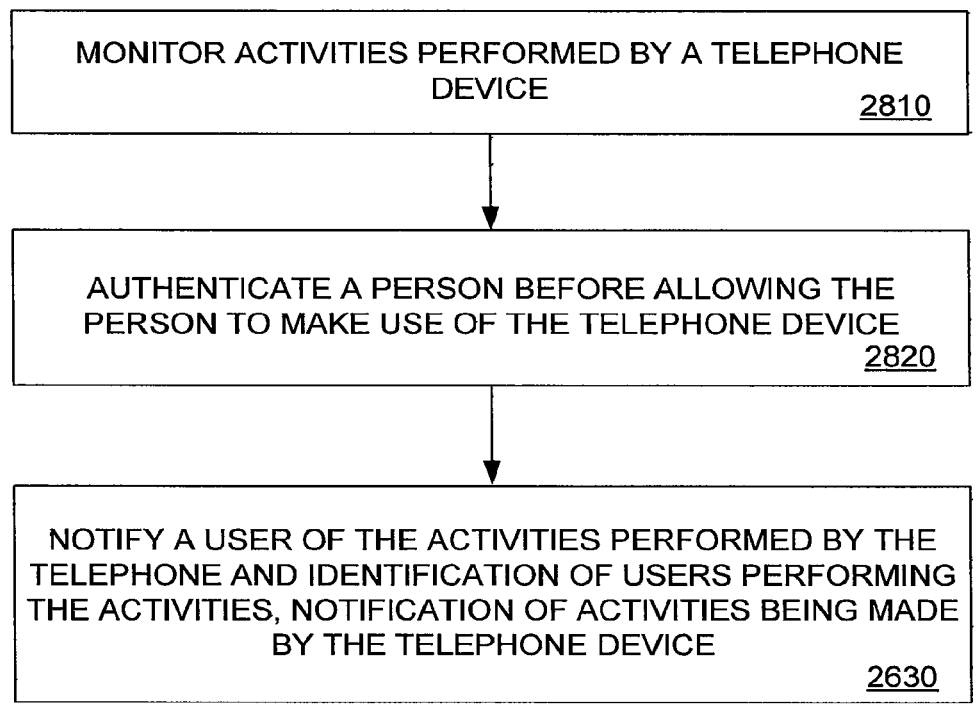
FIG. 28 is a flow chart illustrating a method of supervision and notification using the BBS of FIG. 2.

Referring now to FIG. 28, a flow chart illustrating a method of supervision and notification is shown. The method includes monitoring (2810) activities performed by a telephone device and authenticating (2820) a person before allowing the person to make use of the telephone device. The method further includes notifying (2830) a user of the activities performed by the telephone and identification of users performing the activities—notification of activities being made by the telephone device. In one embodiment, notification of a user involves sending an electronic message to the user via the telephone device. Alternatively, notification may involve making a phone call to the user via the telephone device. Also various embodiments may also maintain a set of rules on which users of the telephone device are allowed to perform certain activities on the telephone device and/or send a message to the user to allow a prohibited activity when a current user of the telephone device is requesting to perform an activity that is not allowed by the set of rules maintained on the telephone device. The message may also be an instant message having options for either authorizing the prohibited activity or not authorizing the prohibited activity, where the activity is an outgoing call and the notification message is sent before the outgoing call is connected, in one or more embodiments.

Aspects of embodiments of the present disclosure can be implemented in hardware, software, firmware, or a combination thereof. If implemented in software or firmware, components may be stored in a memory and that is executed by a suitable instruction execution system. If implemented in hardware, components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure are merely possible examples of implementations, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

The invention claimed is:

1. A method, comprising:
    receiving, at a device, an incoming call to a called number assigned to the device;
    retrieving, from memory of the device, an address associated with the called number;
    sending, from the device, an electronic message to the address to identify a calling number of the incoming call before answering the call;
    updating a log of calls stored in the memory with the incoming call;
    receiving, by the device, a reply electronic message from the address; and
    sending, by the device, the log of calls to the address.

2. The method of claim 1, further comprising receiving a request for the log of calls.

3. The method of claim 1, further comprising sending a web page that displays the log of calls.

4. The method of claim 1, further comprising populating the log of calls.

5. The method of claim 1, further comprising receiving a ring signal to the called number.

6. The method of claim 1, further comprising producing a ring at the device associated with the called number.

7. The method of claim 1, further comprising producing a single ring at the device associated with the called number to announce the incoming call.

8. The method of claim 1, further comprising sending the electronic message before the incoming call is answered at the device.

9. A system, comprising:

a processor;

a memory storing code that when executed causes the processor to perform operations, the operations comprising:

receiving an incoming call to a called number assigned to a device;

retrieving an address associated with the called number;

sending an electronic message from the device to the address to identify a calling number of the incoming call before answering the call;

updating a log of calls stored in the memory with the incoming call;

receiving, at the device, a reply electronic message from the address; and sending, from the device, the log of calls to the address.

10. The system according to claim 9, wherein the operations further comprise receiving a request for the log of calls.

11. The system according to claim 9, wherein the operations further comprise sending a web page that displays the log of calls.

12. The system according to claim 9, wherein the operations further comprise populating the log of calls.

13. The system according to claim 9, wherein the operations further ringing the called number.

14. The system according to claim 9, wherein the operations further producing a ring at the device associated with the called number.

15. The system according to claim 9, wherein the operations further producing a single ring at the device associated with the called number to announce the incoming call.

16. The system according to claim 9, wherein the operations further comprise sending the electronic message before the incoming call is answered.

17. A memory storing code which, when executed by a processor, causes the processor to perform operations, the operations comprising:

receiving an incoming call to a called number assigned to a device;

retrieving an address associated with the called number;

sending, from the device, an electronic message to the address to identify a calling number of the incoming call before answering the call;

updating a log of calls stored in the memory with the incoming call;

receiving, at the device, a reply electronic message from the address; and sending, from the device, the log of calls to the address.

18. The memory of claim 17, wherein the operations further comprise receiving a request for the log of calls.

19. The memory of claim 17, wherein the operations further comprise sending a web page that displays the log of calls.

20. The memory of claim 17, wherein the operations further comprise sending the electronic message before the incoming call is answered.

* * * * *